United States Patent
Fu et al.

(10) Patent No.: US 10,432,580 B2
(45) Date of Patent: Oct. 1, 2019

(54) MESSAGE PROCESSING METHOD, APPARATUS, AND SYSTEM

(71) Applicant: Huawei Technologies Co., Ltd., Shenzhen (CN)

(72) Inventors: Yu Fu, Shenzhen (CN); Sheng Jiang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 120 days.

(21) Appl. No.: 15/821,378

(22) Filed: Nov. 22, 2017

(65) Prior Publication Data
US 2018/0097773 A1 Apr. 5, 2018

Related U.S. Application Data

(63) Continuation of application No. PCT/CN2015/079723, filed on May 25, 2015.

(51) Int. Cl.
*G06F 15/16* (2006.01)
*H04L 29/12* (2006.01)
(Continued)

(52) U.S. Cl.
CPC ...... *H04L 61/2015* (2013.01); *H04L 63/0414* (2013.01); *H04L 67/42* (2013.01); *H04W 12/02* (2013.01); *H04L 61/6059* (2013.01)

(58) Field of Classification Search
CPC . H04L 61/2015; H04L 63/0414; H04L 67/42; H04L 61/6059; H04W 12/02
(Continued)

(56) References Cited

U.S. PATENT DOCUMENTS 8,276,140 B1 * 9/2012 Beda, III .............. G06F 9/5077 709/224
2009/0204691 A1 8/2009 Xia et al.
(Continued)

FOREIGN PATENT DOCUMENTS

CN 1710985 A 12/2005
CN 101227356 A 7/2008
(Continued)

OTHER PUBLICATIONS

Tront, J., et al., "Security and Privacy produced by DHCP Unique Identifiers," XP032078051, NANO, Symposium on Information Technology and Reliability (NASNIT), Oct. 24, 2011, pp. 170-179.
Huitema, C., et al.,"Anonymity profile for DHCP clients," XP015106281, draft-ietf-dhc-anonymity-profile-00.txt, May 19, 2015, 20 pages.
Foreign Communication From a Counterpart Application, European Application No. 15892867.1, Extended European Search Report dated Mar. 29, 2018, 8 pages.
(Continued)

*Primary Examiner* — Krisna Lim
(74) *Attorney, Agent, or Firm* — Conley Rose, P.C.

(57) ABSTRACT

A message processing method, apparatus, and system, where the method includes sending, by a Dynamic Host Configuration Protocol for Internet Protocol version 6 (DHCPv6) client apparatus, a first message requesting assignment of an Internet Protocol version 6 (IPv6) address to a DHCPv6 server, where the first message includes a first random identifier identifying the DHCPv6 client apparatus, receiving a first reply message from the DHCPv6 server, sending a second message to the DHCPv6 server, where the second message includes a second random identifier generated using a preset algorithm and the first random identifier and identifies the DHCPv6 client apparatus, and receiving a second reply message from the DHCPv6 server. Therefore, a problem that privacy is easy to monitor or steal in an interaction process between the DHCPv6 client apparatus and the DHCPv6 server is resolved.

18 Claims, 11 Drawing Sheets

(51) Int. Cl.
*H04L 29/06* (2006.01)
*H04W 12/02* (2009.01)

(58) Field of Classification Search
USPC .......................................................... 709/203
See application file for complete search history.

(56) References Cited

U.S. PATENT DOCUMENTS

| | | | | |
|---|---|---|---|---|
| 2014/0105214 A1* | 4/2014 | Li | .................... | H04L 61/2015 370/392 |
| 2014/0344421 A1* | 11/2014 | Liu | .................... | H04L 41/0803 709/220 |
| 2015/0237005 A1* | 8/2015 | Tian | .................... | H04L 61/6022 709/245 |
| 2016/0080315 A1* | 3/2016 | Anggawijaya | ...... | H04L 61/2015 709/228 |
| 2016/0380963 A1* | 12/2016 | Wang | .................... | H04L 69/167 709/245 |

FOREIGN PATENT DOCUMENTS

| | | | | |
|---|---|---|---|---|
| CN | 103384282 | A | | 11/2013 |
| CN | 103731394 | A | | 4/2014 |
| EP | 3276920 | A1 | * | 1/2018 ......... H04L 61/2015 |
| KR | 101359372 | B1 | | 2/2014 |

OTHER PUBLICATIONS

Machine Translation and Abstract of Chinese Publication No. CN101227356, Jul. 23, 2008, 14 pages.
Machine Translation and Abstract of Chinese Publication No. CN103384282, Nov. 6, 2013, 17 pages.
Machine Translation and Abstract of Chinese Publication No. CN103731394, Apr. 16, 2014, 36 pages.
Machine Translation and Abstract of Korean Publication No. KR101359372, Feb. 7, 2014, 8 pages.
Droms, R., Ed., et al., "Dynamic Host Configuration Protocol for IPv6 (DHCPv6)," RFC3315, Jul. 2003, 101 pages.
Foreign Communication From a Counterpart Application, PCT Application No. PCT/CN2015/079723, English Translation of International Search Report dated Mar. 1, 2016, 2 pages.
Machine Translation and Abstract of Chinese Publication No. CN1710985, Dec. 21, 2005, 8 pages.
Foreign Communication From a Counterpart Application, Chinese Application No. 201580000719.8, Chinese Search Report dated Nov. 26, 2018, 2 pages.
Foreign Communication From a Counterpart Application, Chinese Application No. 201580000719.8, English Translation Chinese Search Report dated Dec. 18, 2018, 7 pages.

* cited by examiner

FIG. 3

MESSAGE PROCESSING METHOD, APPARATUS, AND SYSTEM

CROSS-REFERENCE TO RELATED APPLICATION

This application is a continuation of International Patent Application No. PCT/CN2015/079723 filed on May 25, 2015, which is hereby incorporated by reference in its entirety.

TECHNICAL FIELD

The present application relates to network communications technologies, and in particular, to a message processing method, apparatus, and system.

BACKGROUND

The Dynamic Host Configuration Protocol for Internet Protocol version 6 (DHCPv6) is a network protocol for configuring an Internet Protocol (IP) address, an IP prefix, and/or other configuration information that are required by a DHCPv6 client apparatus operating in an IP version 6 (IPv6) network. DHCPv6 is a stateful address autoconfiguration protocol. In a stateful address configuration process, a DHCPv6 server assigns a complete IPv6 address to a DHCPv6 client apparatus. A Dynamic Host Configuration Protocol (DHCP) unique identifier (DUID) is an identifier for uniquely identifying one DHCPv6 client apparatus. In an interaction process between the DHCPv6 server and the DHCPv6 client apparatus, the DUID is unique and stable, and basically, the DUID of the DHCPv6 client apparatus is unchangeable.

However, in actual application, at least the following problem exists in the foregoing manner. In a network transmission process, the DUID is easy to monitor or steal, and consequently, privacy of the DHCPv6 client apparatus is exposed.

SUMMARY

In view of this, embodiments of the present application provide a message processing method, apparatus, and system in order to protect privacy of a DHCPv6 client apparatus and improve network transmission security in an interaction scenario between the DHCPv6 client apparatus and a DHCPv6 server.

Technical solutions provided in the embodiments of the present application are as follows.

According to a first aspect, a message processing method is provided, including sending, by a DHCPv6 client apparatus, a first message used to request assignment of an IPv6 address to a DHCPv6 server, where the first message includes a first random identifier, the first random identifier is a random identifier generated by the DHCPv6 client apparatus and used to identify the DHCPv6 client apparatus, and the first message does not include a DUID, receiving, by the DHCPv6 client apparatus, a first reply message from the DHCPv6 server, where the first reply message includes a first IPv6 address, first configuration information, and the first random identifier, sending, by the DHCPv6 client apparatus, a second message to the DHCPv6 server, where the second message includes a second random identifier, the second random identifier is a random identifier generated by the DHCPv6 client apparatus using a preset algorithm and the first random identifier and used to identify the DHCPv6 client apparatus, the second random identifier is different from the first random identifier, and the second message does not include the DUID, and receiving, by the DHCPv6 client apparatus, a second reply message from the DHCPv6 server, where the second reply message includes a second IPv6 address, second configuration information, and the second random identifier.

In a first possible implementation of the first aspect, the second message includes an identifier of the preset algorithm, and the identifier of the preset algorithm is used to identify the preset algorithm.

With reference to the first possible implementation of the first aspect, in a second possible implementation of the first aspect, before sending, by a DHCPv6 client apparatus, a first message to a DHCPv6 server, the method further includes obtaining, by the DHCPv6 client apparatus, the identifier of the preset algorithm and the preset algorithm from a portal server, where the portal server stores a one-to-one correspondence between at least two algorithms and algorithm identifiers, and the at least two algorithms include the preset algorithm.

In a third possible implementation of the first aspect, the second message includes the preset algorithm, and the preset algorithm is stored in the DHCPv6 client apparatus in advance or is obtained from a portal server by the DHCPv6 client apparatus.

With reference to any one of the first aspect or the possible implementations of the first aspect, in a fourth possible implementation of the first aspect, the preset algorithm includes an amplification multiple, the first random identifier is less than the amplification multiple, and the amplification multiple is greater than 0.

With reference to the fourth possible implementation of the first aspect, in a fifth possible implementation of the first aspect, the second random identifier is equal to a sum of the first random identifier and a product of a random number and the amplification multiple, and the random number is a positive integer.

According to a second aspect, a message processing method performed by a DHCPv6 server is provided, the DHCPv6 server stores a first random identifier, and the method includes receiving, by the DHCPv6 server, a message from a DHCPv6 client apparatus, where the message includes a second random identifier, the second random identifier is used to identify the DHCPv6 client apparatus, the second random identifier is different from the first random identifier, and the message does not include a DUID, determining, by the DHCPv6 server, whether a relationship between the second random identifier and the first random identifier meets a preset algorithm, determining, by the DHCPv6 server, that the DHCPv6 client apparatus identified by the second random identifier is a DHCPv6 client apparatus identified by the first random identifier when the relationship between the second random identifier and the first random identifier meets the preset algorithm, and sending, by the DHCPv6 server, a reply message to the DHCPv6 client apparatus identified by the second random identifier, where the reply message includes an IPv6 address, configuration information, and the second random identifier.

In a first possible implementation of the second aspect, when the DHCPv6 server determines that the relationship between the second random identifier and the first random identifier does not meet the preset algorithm, the method further includes assigning an IPv6 address to the DHCPv6 client apparatus identified by the second random identifier, and storing a correspondence between the assigned IPv6 address and the second random identifier.

With reference to the second aspect or the first possible implementation of the second aspect, in a second possible implementation of the second aspect, the preset algorithm includes an amplification multiple, and determining, by the DHCPv6 server, whether a relationship between the second random identifier and the first random identifier meets a preset algorithm includes determining, by the DHCPv6 server, whether a result of performing a modulo operation on the amplification multiple by the second random identifier is equal to the first random identifier, and determining, by the DHCPv6 server, that the relationship between the second random identifier and the first random identifier meets the preset algorithm when the result of performing a modulo operation on the amplification multiple by the second random identifier is equal to the first random identifier.

With reference to any one of the second aspect or the possible implementations of the second aspect, in a third possible implementation of the second aspect, the message further includes an identifier of the preset algorithm, and the DHCPv6 server obtains the preset algorithm according to the identifier of the preset algorithm.

With reference to the third possible implementation of the second aspect, in a fourth possible implementation of the second aspect, the DHCPv6 server stores a one-to-one correspondence between at least two algorithms and algorithm identifiers, and the at least two algorithms include the preset algorithm.

With reference to the third possible implementation of the second aspect, in a fifth possible implementation of the second aspect, the DHCPv6 server obtains, from a portal server, the algorithm corresponding to the identifier of the preset algorithm, the portal server stores a one-to-one correspondence between at least two algorithms and algorithm identifiers, and the at least two algorithms include the preset algorithm.

According to a third aspect, a method performed by a portal server to communicate with a DHCPv6 client apparatus is provided, the portal server stores a one-to-one correspondence between at least two algorithms and algorithm identifiers, and the method includes receiving, by the portal server, an authentication request message from the DHCPv6 client apparatus, performing, by the portal server, authentication on the DHCPv6 client apparatus, and sending, by the portal server, an authentication pass message to the DHCPv6 client apparatus when the portal server successfully authenticates the DHCPv6 client apparatus, where the authentication pass message includes an identifier of a preset algorithm, and the preset algorithm is an algorithm in the at least two algorithms.

In a first possible implementation of the third aspect, the authentication pass message includes attribute information, and the attribute information includes the identifier of the preset algorithm.

According to a fourth aspect, a DHCPv6 client apparatus is provided, including a processing unit configured to generate a first random identifier used to identify the DHCPv6 client apparatus, a sending unit configured to send a first message used to request assignment of an IPv6 address to a DHCPv6 server, where the first message carries the first random identifier, and the first message does not include a DUID, and a receiving unit configured to receive a first reply message from the DHCPv6 server, where the first reply message includes a first IPv6 address, first configuration information, and the first random identifier. The processing unit is further configured to generate, using a preset algorithm and the first random identifier, a second random identifier used to identify the DHCPv6 client apparatus, where the second random identifier is different from the first random identifier. The sending unit is further configured to send a second message to the DHCPv6 server, where the second message carries the second random identifier, and the second message does not include the DUID, and the receiving unit is further configured to receive a second reply message from the DHCPv6 server, where the second reply message includes a second IPv6 address, second configuration information, and the second random identifier.

In a first possible implementation of the fourth aspect, the second message includes an identifier of the preset algorithm, and the identifier of the preset algorithm is used to identify the preset algorithm.

With reference to the first possible implementation of the fourth aspect, in a second possible implementation of the fourth aspect, before the sending unit sends the first message, the receiving unit is further configured to obtain the identifier of the preset algorithm and the preset algorithm from a portal server, where the portal server stores a one-to-one correspondence between at least two algorithms and algorithm identifiers, and the at least two algorithms include the preset algorithm.

With reference to any one of the fourth aspect or the possible implementations of the fourth aspect, in a third possible implementation of the fourth aspect, the preset algorithm includes an amplification multiple, the first random identifier is less than the amplification multiple, and the amplification multiple is greater than 0.

With reference to the third possible implementation of the fourth aspect, in a fourth possible implementation of the fourth aspect, the second random identifier is equal to a sum of the first random identifier and a product of a random number and the amplification multiple, and the random number is a positive integer.

According to a fifth aspect, a DHCPv6 server is provided, including a storage unit configured to store a first random identifier, a receiving unit configured to receive a message from a DHCPv6 client apparatus, where the message includes a second random identifier used to identify the DHCPv6 client apparatus, the second random identifier is different from the first random identifier, and the message does not include a DUID, a processing unit configured to determine whether a relationship between the second random identifier and the first random identifier meets a preset algorithm, and determine that the DHCPv6 client apparatus identified by the second random identifier is a DHCPv6 client apparatus identified by the first random identifier when the relationship between the second random identifier and the first random identifier meets the preset algorithm, and a sending unit configured to send a reply message to the DHCPv6 client apparatus identified by the second random identifier, where the reply message includes an IPv6 address, configuration information, and the second random identifier.

In a first possible implementation of the fifth aspect, when the relationship between the second random identifier and the first random identifier does not meet the preset algorithm, the processing unit is further configured to assign an IPv6 address to the DHCPv6 client apparatus identified by the second random identifier, and store a correspondence between the assigned IPv6 address and the second random identifier.

With reference to the fifth aspect or the first possible implementation of the fifth aspect, in a second possible implementation of the fifth aspect, the preset algorithm includes an amplification multiple, and the processing unit is further configured to determine whether a result of performing a modulo operation on the amplification multiple by the second random identifier is equal to the first random identifier, and determine that the relationship between the second random identifier and the first random identifier meets the preset algorithm when the DHCPv6 server determines that the result of performing a modulo operation on the amplification multiple by the second random identifier is equal to the first random identifier.

With reference to any one of the fifth aspect or the possible implementations of the fifth aspect, in a third possible implementation of the fifth aspect, the message further includes an identifier of the preset algorithm, and the processing unit is further configured to obtain the preset algorithm according to the identifier of the preset algorithm.

With reference to the third possible implementation of the fifth aspect, in a fourth possible implementation of the fifth aspect, the storage unit is further configured to store a one-to-one correspondence between at least two algorithms and algorithm identifiers, and the at least two algorithms include the preset algorithm.

According to a sixth aspect, a portal server is provided, including a storage unit configured to store a one-to-one correspondence between at least two algorithms and algorithm identifiers, a receiving unit configured to receive an authentication request message from a DHCPv6 client apparatus, an authentication unit configured to perform authentication on the DHCPv6 client apparatus, and a sending unit configured to send an authentication pass message to the DHCPv6 client apparatus when the authentication unit successfully authenticates the DHCPv6 client apparatus, where the authentication pass message includes an identifier of a preset algorithm, and the preset algorithm is an algorithm in the at least two algorithms.

In a first possible implementation of the sixth aspect, the authentication pass message includes attribute information, and the attribute information includes the identifier of the preset algorithm.

According to a seventh aspect, a message processing system is provided, including the DHCPv6 client apparatus according to any one of the fourth aspect or the possible implementations of the fourth aspect and the DHCPv6 server according to any one of the fifth aspect or the possible implementations of the fifth aspect.

In a first possible implementation of the seventh aspect, the system further includes the portal server according to either of the sixth aspect or the possible implementation of the sixth aspect.

In the implementations of the present application, a DHCPv6 client apparatus sends a first message used to request assignment of an IPv6 address to a DHCPv6 server, where the first message includes a first random identifier used to identify the DHCPv6 client apparatus, and the first message does not include a DUID. The DHCPv6 client apparatus receives a first reply message that is from the DHCPv6 server and that includes a first IPv6 address, first configuration information, and the first random identifier. The DHCPv6 client apparatus further sends a second message to the DHCPv6 server, where the second message includes a second random identifier generated using a preset algorithm and the first random identifier and used to identify the DHCPv6 client apparatus, the second random identifier is different from the first random identifier, and the second message does not include the DUID, and the DHCPv6 client apparatus receives a second reply message that is from the DHCPv6 server and that includes a second IPv6 address, second configuration information, and the second random identifier. The DHCPv6 client apparatus uses a random identifier when sending a message to the DHCPv6 server. Different random identifiers are used for different messages in order to resolve a problem that privacy of the DHCPv6 client apparatus is easy to monitor or steal in an interaction process between the DHCPv6 client apparatus and the DHCPv6 server.

BRIEF DESCRIPTION OF DRAWINGS

FIG. 3 is an implementation format of a random identifier field in a client identifier option according to an embodiment of the present application;

DESCRIPTION OF EMBODIMENTS

Embodiments of the present application provide a message processing method, apparatus, and system in order to protect privacy of a DHCPv6 client apparatus and improve network transmission security in a service scenario in which the DHCPv6 client apparatus interacts with a DHCPv6 server.

The following provides detailed descriptions separately using specific embodiments.

To make the application objectives, features, and advantages of the present application clearer and more comprehensible, the following clearly describes the technical solutions in the embodiments of the present application with reference to the accompanying drawings in the embodiments of the present application. The embodiments described in the following are merely a part rather than all of the embodiments of the present application. All other embodiments obtained by persons of ordinary skill in the art based on the embodiments of the present application without creative efforts shall fall within the protection scope of the present application.

In the specification, claims, and accompanying drawings of this application, the terms "first," "second," "third," "fourth" and the like are intended to distinguish between different objects but do not indicate a particular order. In addition, the terms "include" and "have" are not exclusive. For example, a process, a method, a system, a product, or a device including a series of steps or units is not limited to the listed steps or units, and may further include steps or units that are not listed.

Figure 1:
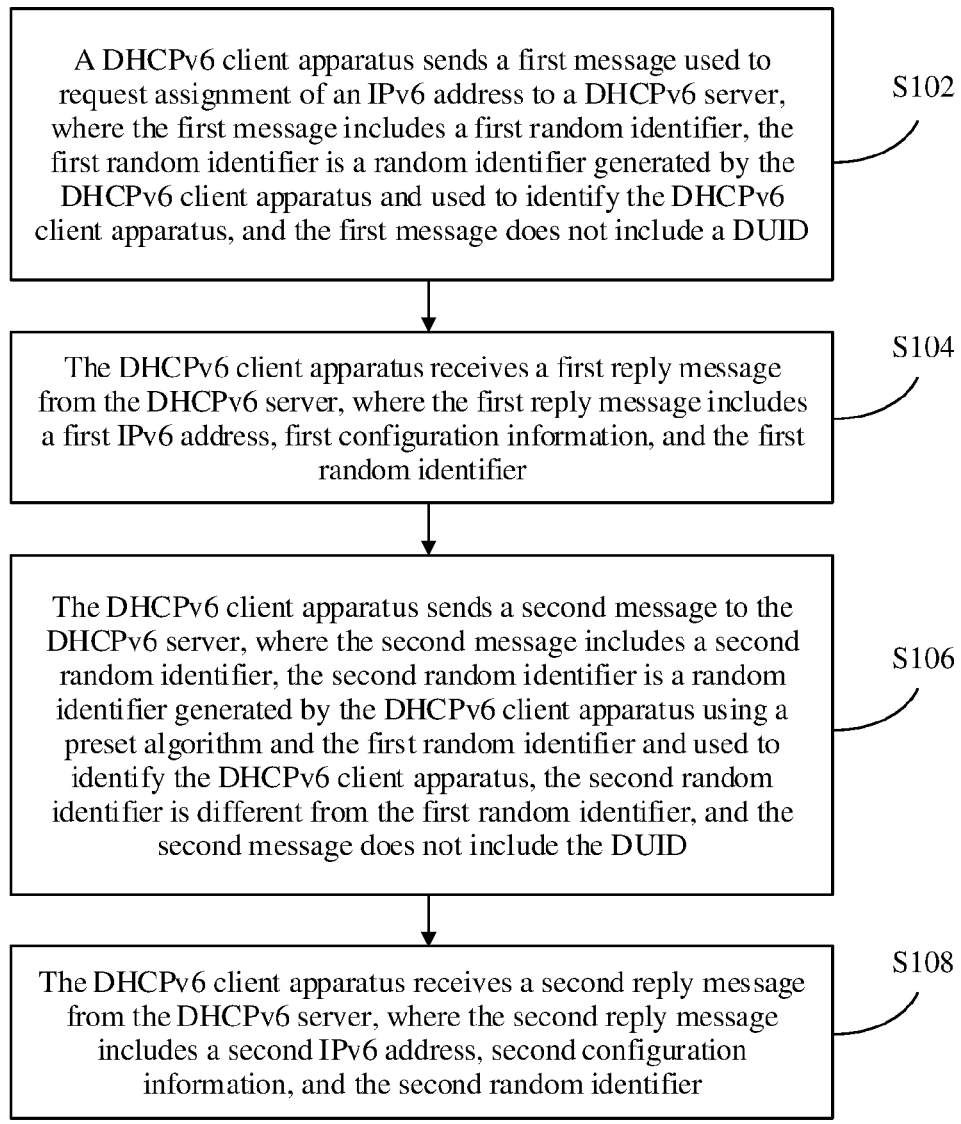
FIG. 1 is a flowchart of a message processing method according to an embodiment of the present application.

FIG. 1 is a flowchart of a message processing method according to an embodiment of the present application. As shown in FIG. 1, the method may include the following steps.

Step S102: A DHCPv6 client apparatus sends a first message used to request assignment of an IPv6 address to a DHCPv6 server, where the first message includes a first random identifier, the first random identifier is a random identifier generated by the DHCPv6 client apparatus and used to identify the DHCPv6 client apparatus, and the first message does not include a DUID.

The DHCPv6 server is responsible for controlling an IPv6 address range. The DHCPv6 client apparatus can automatically obtain an IPv6 address assigned by the DHCPv6 server when the DHCPv6 client apparatus logs in to the DHCPv6 server. The DHCPv6 client apparatus may send the first message used to request assignment of an IPv6 address to the DHCPv6 server. For example, the first message is a request message. The first message includes the first random identifier, and the first random identifier is a random identifier generated by the DHCPv6 client apparatus and used to identify the DHCPv6 client apparatus. The DHCPv6 client apparatus may obtain the first random identifier by generating a random number. The first message does not include the DUID. A location of the first random identifier in the first message is not limited as long as the first random identifier can be obtained by the DHCPv6 server. A specific form of the DHCPv6 client apparatus is not limited, and the DHCPv6 client apparatus may be but not limited to a desktop computer, a portable computer, a smartphone, a tablet computer, and a wearable intelligent device.

Figure 2:
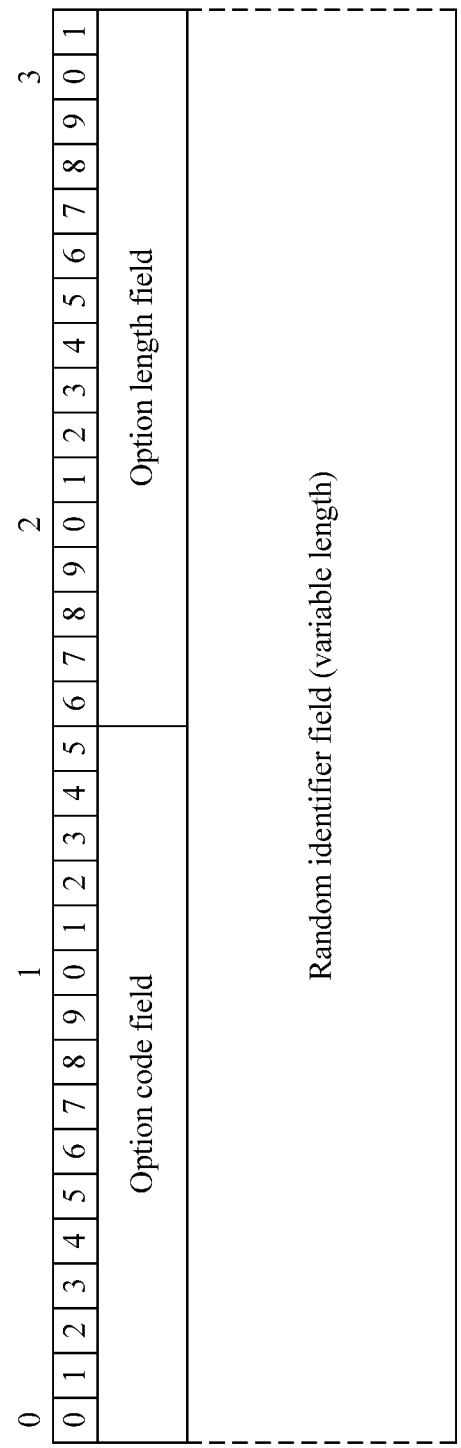
FIG. 2 is a packet header format of a client identifier option according to an embodiment of the present application.

In an embodiment, the first message may be a request message, and the request message may include a client identifier option. For example, the client identifier option may be used to carry the first random identifier. Referring to FIG. 2, FIG. 2 is a header format of a client identifier option according to an embodiment of the present application. The header format of the client identifier option includes an option code field, an option length field, and a random identifier field. The option code field represents a type of packet transfer. For example, for the client identifier option, an assignment of the option code field is OPTION_CLIENTID (1). The option length field represents a length of the random identifier field. The random identifier field may be used to carry the first random identifier. The random identifier field has a variable length.

Step S104: The DHCPv6 client apparatus receives a first reply message from the DHCPv6 server, where the first reply message includes a first IPv6 address, first configuration information, and the first random identifier.

After receiving the first message, the DHCPv6 server generates address binding information. The address binding information includes a binding relationship between the first random identifier and both the first IPv6 address and the first configuration information. The DHCPv6 server may send the first reply message to the DHCPv6 client apparatus. The first reply message includes the first random identifier, and the first IPv6 address and the first configuration information that are corresponding to the first random identifier. The first configuration information may include, for example, lease information. The first reply message carries the first random identifier, and this ensures that the DHCPv6 client apparatus that sends the first message can receive the first reply message from the DHCPv6 server.

Step S106: The DHCPv6 client apparatus sends a second message to the DHCPv6 server, where the second message includes a second random identifier, the second random identifier is a random identifier generated by the DHCPv6 client apparatus using a preset algorithm and the first random identifier and used to identify the DHCPv6 client apparatus, the second random identifier is different from the first random identifier, and the second message does not include the DUID.

The DHCPv6 client apparatus may send the second message to the DHCPv6 server. For example, when a lease of an IPv6 address required for assignment expires, the DHCPv6 client apparatus sends the second message, such as, a renew message. For another example, before a lease of an IPv6 address assigned by the DHCPv6 server expires, the DHCPv6 client apparatus disconnects from a network, and then the DHCPv6 client apparatus accesses the network again and sends the second message, such as, a request message.

The second message includes the second random identifier. The second random identifier is a random identifier generated by the DHCPv6 client apparatus and used to identify the DHCPv6 client apparatus. In addition, the second random identifier is generated based on the preset algorithm and the first random identifier. That is, the first random identifier and the second random identifier are correlated using the preset algorithm. The second random identifier and the first random identifier are different random identifiers. The preset algorithm is not limited as long as the second random identifier and the first random identifier can be correlated using the algorithm. That is, the second random identifier can be uniquely corresponding to the first random identifier using an operation of the preset algorithm.

Step S108: The DHCPv6 client apparatus receives a second reply message from the DHCPv6 server, where the second reply message includes a second IPv6 address, second configuration information, and the second random identifier.

After receiving the second message, the DHCPv6 server processes the second message. For example, the second message may be a renew message. The DHCPv6 server sends the DHCPv6 client apparatus the second reply message that includes the second IPv6 address, the second configuration information such as renew information, and the second random identifier. The second IPv6 address may be an IPv6 address previously assigned by the DHCPv6 server to the DHCPv6 client apparatus, or may be an IPv6 address reassigned by the DHCPv6 server to the DHCPv6 client apparatus. For example, the second message may be a request message. After receiving the request message, the DHCPv6 server reassigns an IPv6 address and configuration information to the DHCPv6 client apparatus. The second reply message carries the second random identifier, and this ensures that the DHCPv6 client apparatus that sends the second message can receive the second reply message from the DHCPv6 server.

In the message processing method provided in this embodiment, when a DHCPv6 client apparatus sends a first message to a DHCPv6 server, a first random identifier is carried, and when the DHCPv6 client apparatus sends a second message to the DHCPv6 server, a second random identifier generated using the first random identifier and a preset algorithm is carried. In addition, the second random identifier and the first random identifier are different random identifiers. In this way, the DHCPv6 client apparatus is identified using a random identifier in order to protect privacy of the DHCPv6 client apparatus, and improve network transmission security.

Optionally, the second message includes an identifier of the preset algorithm, and the identifier of the preset algorithm is used to identify the preset algorithm.

Figure 3:
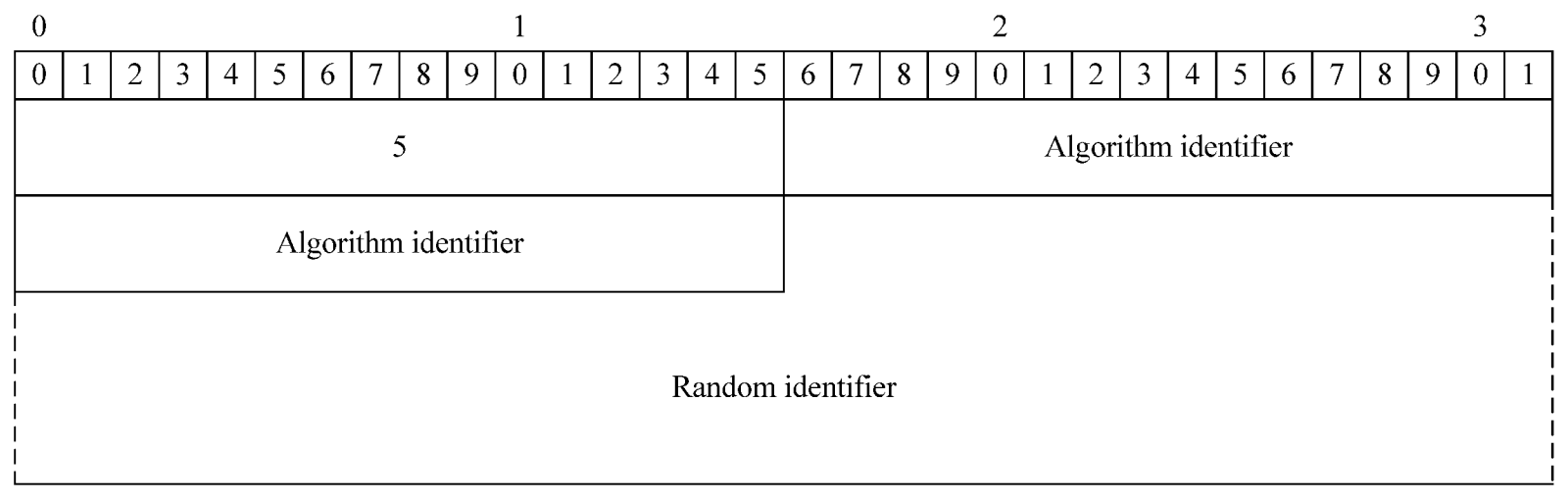

For example, the second message sent by the DHCPv6 client apparatus to the DHCPv6 server includes the second random identifier. The second random identifier is generated by the DHCPv6 client apparatus using the first random identifier and the preset algorithm. After obtaining the second random identifier, the DHCPv6 server determines, using the same preset algorithm, whether a relationship between the second random identifier and the first random identifier meets the preset algorithm. Therefore, the DHCPv6 client apparatus needs to notify the DHCPv6 server of the algorithm used to generate the second random identifier. If both the DHCPv6 client apparatus and the DHCPv6 server store a correspondence between the preset algorithm and an identifier, and the second message includes the identifier of the preset algorithm, the DHCPv6 server obtains the algorithm corresponding to the identifier of the preset algorithm by querying the locally stored correspondence. Referring to FIG. 3, FIG. 3 is an implementation format of a random identifier field in a client identifier option according to an embodiment of the present application. The implementation format of the random identifier field in FIG. 3 may be a specific implementation of the random identifier field in FIG. 1. In FIG. 3, "5" represents an identifier of the random identifier field. Herein, "5" is used as only an example. In actual application, the identifier may be assigned by the Internet Assigned Numbers Authority (IANA). The implementation format of content of the random identifier field shown in FIG. 3 includes an algorithm identifier and a random identifier. When a message is sent to the DHCPv6 server, in addition to the second random identifier, the algorithm identifier is carried such that the DHCPv6 server can determine, using the same algorithm as the DHCPv6 client apparatus uses, whether the relationship between the second random identifier and the first random identifier meets the preset algorithm.

For example, the DHCPv6 client apparatus may include a unique preset algorithm. Similarly, the DHCPv6 server may also include the unique preset algorithm. In this case, the DHCPv6 client apparatus and the DHCPv6 server use a same preset algorithm. Therefore, when the DHCPv6 client apparatus sends a message to the DHCPv6 server, the preset algorithm or the identifier of the preset algorithm does not need to be carried. In this case, the implementation format of the content of the random identifier field shown in FIG. 3 may not use the algorithm identifier field, or the algorithm identifier field may be set to null.

Optionally, before sending, by a DHCPv6 client apparatus, a first message to a DHCPv6 server, the method further includes that the DHCPv6 client apparatus obtains the identifier of the preset algorithm and the preset algorithm from a portal server, where the portal server stores a one-to-one correspondence between at least two algorithms and algorithm identifiers, and the at least two algorithms include the preset algorithm.

The portal server is responsible for performing authentication on the DHCPv6 client apparatus before an interaction process between the DHCPv6 client apparatus and the DHCPv6 server. That is, the portal server processes an authentication request message sent by the DHCPv6 client apparatus to implement validity authentication for the DHCPv6 client apparatus. The portal server may store the one-to-one correspondence between at least two algorithms and algorithm identifiers, and the DHCPv6 client apparatus may not store an algorithm in advance. Before the DHCPv6 client apparatus sends the first message to the DHCPv6 server, in an authentication phase, the DHCPv6 client apparatus obtains the identifier of the preset algorithm and the preset algorithm from the portal server. The preset algorithm is an algorithm in the at least two algorithms stored in the portal server. In this way, when an algorithm library that includes at least two algorithms is being updated, only an algorithm library of the portal server needs to be updated.

For example, when the DHCPv6 client apparatus obtains an algorithm from the portal server, some encryption means may be used. For example, IP Security (IPsec) is used to encrypt a transmitted algorithm.

The algorithm library that includes at least two algorithms may be stored in the DHCPv6 client apparatus in advance. In addition, the DHCPv6 client apparatus correspondingly stores the one-to-one correspondence between at least two algorithms and algorithm identifiers. In this way, when the portal server performs authentication on the DHCPv6 client apparatus, the DHCPv6 client apparatus needs to obtain only an algorithm identifier from the portal server. The DHCPv6 client apparatus obtains an algorithm corresponding to the algorithm identifier from the algorithm library locally stored in advance.

For example, when the second message sent by the DHCPv6 client apparatus is a renew message, it indicates that the DHCPv6 client apparatus makes a renew request to the DHCPv6 server. When a lease expires again, the DHCPv6 client apparatus may further send a renew message to continue to make a renew request. Preset algorithms used in random identifiers included in the two renew messages may be a same algorithm, or may be different algorithms.

Optionally, the second message includes the preset algorithm. The preset algorithm is stored in the DHCPv6 client apparatus in advance. Alternatively, the DHCPv6 client apparatus obtains the preset algorithm from the portal server.

For example, according to the foregoing explanation in this embodiment, the second message may include an algorithm identifier. In the manner shown in FIG. 3, the DHCPv6 server obtains an algorithm corresponding to the algorithm identifier from a locally stored algorithm library, and the corresponding algorithm is found in the DHCPv6 server using the algorithm identifier. Alternatively, when the DHCPv6 client apparatus and the DHCPv6 server include only one algorithm, the second message may not need to carry an identifier of the used algorithm. In an optional implementation, the DHCPv6 server may not store the preset algorithm in advance, but a to-be-used preset algorithm is sent to the DHCPv6 server by adding the preset algorithm to the second message.

Some encryption means may be used when the preset algorithm is sent using the second message. For example, an IPsec protocol is used to encrypt a transmitted algorithm.

Optionally, the preset algorithm includes an amplification multiple, the first random identifier is less than the amplification multiple, and the amplification multiple is greater than 0.

The preset algorithm includes an amplification multiple, and the first random identifier is less than the amplification multiple. The amplification multiple is used to generate the second random identifier. The amplification multiple is variable. Optionally, algorithms that use a same operation rule but use different amplification multiples may be considered as different algorithms. For example, an algorithm 1 uses a modulo algorithm, and uses an amplification multiple A, and an algorithm 2 uses a modulo algorithm, and uses an amplification multiple B. A sequence of determining the first random identifier and the amplification multiple is not limited. For example, an amplification multiple may be first determined, and then a first random identifier less than the amplification multiple is randomly generated. For another example, a random first random identifier may be first generated, and then an amplification multiple greater than the first random identifier is determined.

Optionally, the second random identifier is equal to a sum of the first random identifier and a product of a random number and the amplification multiple, and the random number is a positive integer.

For example, the preset algorithm is a modulo algorithm. For the DHCPv6 client apparatus, an implementation of the modulo algorithm is RandomIDn=Random*Amplification multiple+RandomID1, where RandomID1 is a first random identifier, RandomIDn is a second random identifier, and Random is a random number. For example, an amplification multiple is $2^{100}$ (that is, 2 raised to the $100^{th}$ power), and then, a modulo algorithm is RandomIDn=Random*$2^{100}$±RandomID1.

For example, the preset algorithm is not limited as long as the second random identifier and the first random identifier can be correlated using the algorithm. That is, another algorithm may be used for implementation, for example, a digit quantity modulo algorithm. For the DHCPv6 client apparatus side, an implementation of the digit quantity modulo algorithm is Second random identifier=Random*$10^m$+First random identifier, where Random is a random number, m is a digit quantity of the first random identifier, and $10^m$ (that is, 10 raised to the $m^{th}$ power) is an amplification multiple. For example, if a first random identifier is 1234, a digit quantity of the first random identifier is 4, and an amplification multiple may be $10^4$ (that is, 10 raised to the fourth power).

A simpler algorithm may also be used to implement the preset algorithm, for example, a multiplication algorithm. For the DHCPv6 client apparatus side, an implementation of the multiplication algorithm is Second random identifier=Random*Amplification multiple+First random identifier, where Random is a random number.

For example, a non-mathematical algorithm may also be used to implement the preset algorithm, for example, a digit transposition algorithm. An implementation of the digit transposition algorithm is Second random identifier=Random*First random identifier obtained after digits are transposed, where Random is a random number. The digits are transposed in pairs from a high digit to a low digit. When a digit quantity of the first random identifier is an odd number, the lowest digit is not transposed. For example, a first random identifier is 1234, and a first random identifier obtained after digits are transposed is 2143. For another example, a first random identifier is 12345, a first random identifier obtained after digits are transposed is 21435, and a number "5" is not transposed. Therefore, multiple algorithms with specific forms may be used to implement the preset algorithm, and details are not described herein.

In a usual implementation without using a solution in this embodiment of the present application, in an interaction process between the DHCPv6 client apparatus and the DHCPv6 server, the DHCPv6 client apparatus uses the DUID as a unique identifier. When a message is sent to the DHCPv6 server in a request phase, a renew phase, and a request phase when the DHCPv6 client apparatus accesses a network again, the DUID is used as an identifier of the DHCPv6 client apparatus. In a message transmission process, the DUID is easy to monitor or steal. Because the DUID is unique and stable, privacy of the DHCPv6 client apparatus is prone to exposure. For example, the DUID may be obtained from an intercepted request message, and consequently, the privacy of the DHCPv6 client apparatus is obtained using the DUID, for example, location information. For another example, in a request phase, a renew phase, and a request phase when the DHCPv6 client apparatus accesses a network again, or when the DHCPv6 client apparatus is in different network environments (for example, different WI-FI of a same operator), the DUID is used as an identifier of the DHCPv6 client apparatus. Consequently, a hacker can easily monitor a trace of the DHCPv6 client apparatus using the DUID of the DHCPv6 client apparatus.

In the technical solution provided in this embodiment of the present application, when a DHCPv6 client apparatus sends a first message to a DHCPv6 server, a first random identifier is carried, and when the DHCPv6 client apparatus sends a second message to the DHCPv6 server, a second random identifier generated using a preset algorithm and the first random identifier is carried. In addition, the second random identifier and the first random identifier are different random identifiers. Therefore, the DHCPv6 client apparatus is identified using a random identifier. In a transmission process, even if a random identifier is intercepted, the random identifier cannot be matched to a corresponding DHCPv6 client apparatus. Different random identifiers are used in different phases such that a hacker cannot monitor a trace of the DHCPv6 client apparatus using random identifiers. The DHCPv6 server can determine, using a preset algorithm, whether random identifiers in different phases identify a same terminal device. Therefore, the DHCPv6 server may determine which different random identifiers are corresponding to a same terminal device.

Figure 4:
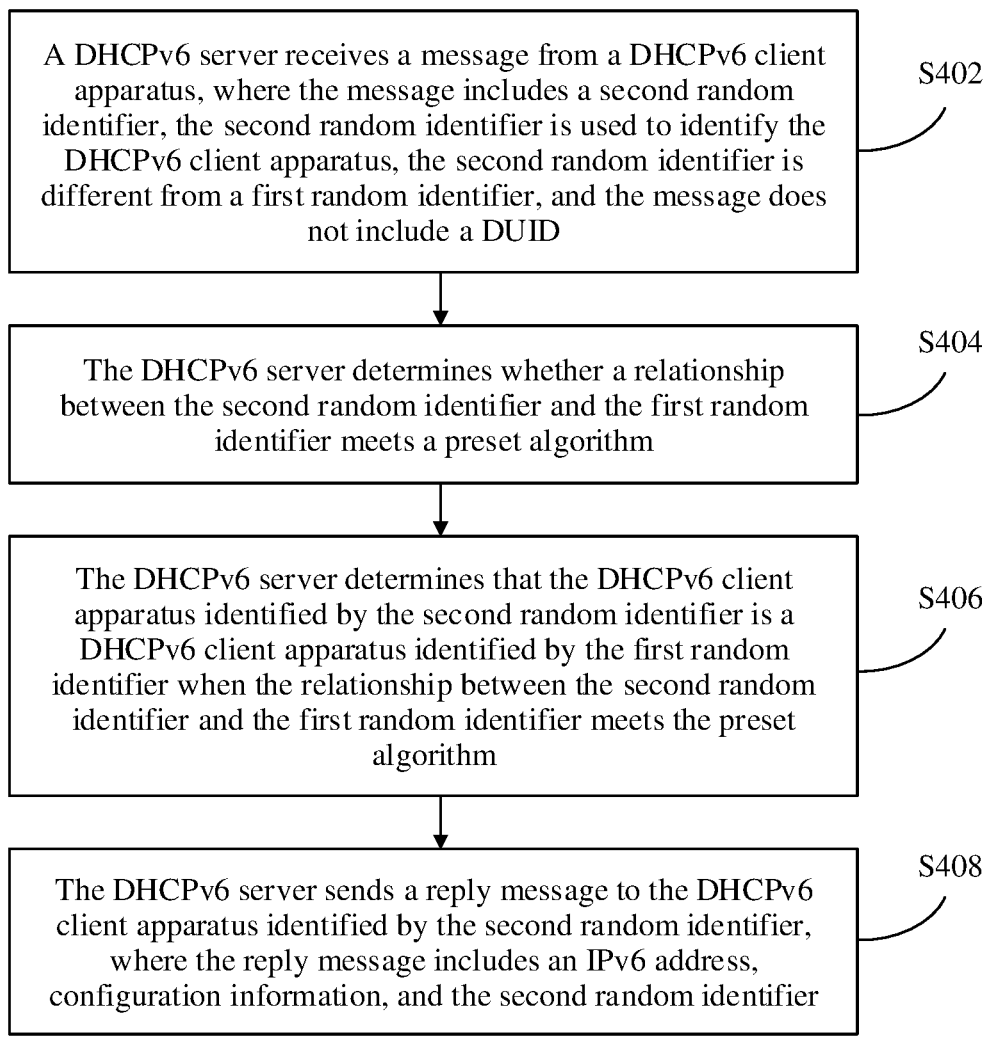
FIG. 4 is a flowchart of a message processing method performed by a DHCPv6 server according to an embodiment of the present application.

FIG. 4 is a flowchart of a message processing method performed by a DHCPv6 server according to an embodiment of the present application. In this embodiment of the present application, the message processing method is described from a perspective of the DHCPv6 server. As shown in FIG. 4, the DHCPv6 server stores a first random identifier, and the method includes the following steps.

Step S402: The DHCPv6 server receives a message from a DHCPv6 client apparatus, where the message includes a second random identifier, the second random identifier is used to identify the DHCPv6 client apparatus, the second random identifier is different from the first random identifier, and the message does not include a DUID.

The DHCPv6 server receives the message from the DHCPv6 client apparatus, the message includes the second random identifier, the second random identifier is generated by the DHCPv6 client apparatus, the second random identifier and the first random identifier are different random identifiers, and the message does not include the DUID.

Step S404: The DHCPv6 server determines whether a relationship between the second random identifier and the first random identifier meets a preset algorithm.

For example, according to description in this embodiment, the second random identifier may be generated by the DHCPv6 client apparatus using the preset algorithm and the first random identifier. Therefore, after obtaining the second random identifier, the DHCPv6 server determines, using the same preset algorithm, whether the relationship between the second random identifier and the first random identifier meets the preset algorithm.

Step S406: The DHCPv6 server determines that the DHCPv6 client apparatus identified by the second random identifier is a DHCPv6 client apparatus identified by the first random identifier when the relationship between the second random identifier and the first random identifier meets the preset algorithm.

For example, if the DHCPv6 server determines that the relationship between the second random identifier and the first random identifier meets the preset algorithm, it can be determined that the DHCPv6 client apparatus identified by the second random identifier and the DHCPv6 client apparatus identified by the first random identifier are a same DHCPv6 client apparatus.

Step S408: The DHCPv6 server sends a reply message to the DHCPv6 client apparatus identified by the second random identifier, where the reply message includes an IPv6 address, configuration information, and the second random identifier.

After receiving the message, the DHCPv6 server processes the message. For example, the message may be a renew message. The DHCPv6 server sends the DHCPv6 client apparatus the reply message that includes the IPv6 address, the configuration information such as renew information, and the second random identifier. The IPv6 address may be an IPv6 address previously assigned by the DHCPv6 server to the DHCPv6 client apparatus, or may be an IPv6 address reassigned by the DHCPv6 server to the DHCPv6 client apparatus. For example, the message may be a request message. After receiving the request message, the DHCPv6 server reassigns an IPv6 address and configuration information to the DHCPv6 client apparatus.

In the message processing method provided in this embodiment, after obtaining a second random identifier, when a relationship between the second random identifier and a first random identifier meets a preset algorithm, a DHCPv6 server determines that a DHCPv6 client apparatus identified by the second random identifier is a DHCPv6 client apparatus identified by the first random identifier. Random identifiers in different phases are associated using the preset algorithm. Therefore, by means of algorithm parsing, the DHCPv6 server may make different random identifiers correspond to a same DHCPv6 client apparatus such that the DHCPv6 server conveniently collects statistics about information of the DHCPv6 client apparatus, such as duration of accessing a network. In this way, one DHCPv6 client apparatus may be allowed to use different random identifiers in order to protect privacy of the DHCPv6 client apparatus and improve network transmission security.

Optionally, when the relationship between the second random identifier and the first random identifier does not meet the preset algorithm, the DHCPv6 server assigns an IPv6 address to the DHCPv6 client apparatus identified by the second random identifier, and stores a correspondence between the IPv6 address and the second random identifier.

For example, if the DHCPv6 server determines that the relationship between the second random identifier and the first random identifier does not meet the preset algorithm, it indicates that the DHCPv6 client apparatus identified by the second random identifier and the DHCPv6 client apparatus identified by the first random identifier are not a same DHCPv6 client apparatus. That is, the DHCPv6 client apparatus identified by the second random identifier is another DHCPv6 client apparatus, and correspondingly, the message is a request message for the other DHCPv6 client apparatus. After receiving the message, the DHCPv6 server generates address binding information. The address binding information includes a binding relationship between the second random identifier and both the IPv6 address and the configuration information. An IPv6 address is assigned to the other DHCPv6 client apparatus, and a correspondence between the IPv6 address and the second random identifier is recorded.

Optionally, the preset algorithm includes an amplification multiple. That the DHCPv6 server determines whether the relationship between the second random identifier and the first random identifier meets the preset algorithm includes that the DHCPv6 server determines whether a result of performing a modulo operation on the amplification multiple by the second random identifier is equal to the first random identifier. When the result of performing a modulo operation on the amplification multiple by the second random identifier is equal to the first random identifier, the DHCPv6 server determines that the relationship between the second random identifier and the first random identifier meets the preset algorithm.

For example, according to the modulo algorithm described in the foregoing embodiment, an implementation of the modulo algorithm used by the DHCPv6 server may be F=(RandomIDn)%Amplification multiple, where RandomIDn is the second random identifier, and % is a modulo operator. If the foregoing operation result F=RandomID1, where RandomID1 is the first random identifier, it indicates that the relationship between the second random identifier and the first random identifier meets the preset algorithm. For example, it is assumed that the first random identifier is 1234, and the amplification multiple is $2^{100}$ (that is, 2 raised to the $100^{th}$ power). After obtaining the second random identifier, the DHCPv6 server calculates F=Second random identifier%$2^{100}$ using a corresponding preset algorithm, and an operation result is 1234, that is, F=1234. Therefore, the relationship between the second random identifier and the first random identifier meets the preset algorithm. It can be determined that the DHCPv6 client apparatus identified by the second random identifier and the DHCPv6 client apparatus identified by the first random identifier are a same DHCPv6 client apparatus.

For example, a specific implementation of the preset algorithm is not limited, that is, multiple different algorithms may be used for implementation. For example, the preset algorithm is implemented according to the digit quantity modulo algorithm described in the foregoing embodiment. An implementation of the used digit quantity modulo algorithm may be F=Second random identifier%$10^{x-y}$, where x is a digit quantity of the second random identifier, y is a digit quantity of a random number, and % is a modulo operator. For example, according to the example in the foregoing embodiment, a first random identifier is 1234, and for example, a random number is 65 such that a second random identifier obtained by means of calculation is 651234. After obtaining the second random identifier, the DHCPv6 server calculates F=651234%$10^{6-2}$=1234 using a corresponding preset algorithm. Therefore, the relationship between the second random identifier and the first random identifier meets the preset algorithm. When the digit quantity modulo algorithm is used, a message received by the DHCPv6 server and sent by the DHCPv6 client apparatus includes a random number.

For another example, the preset algorithm is implemented according to the multiplication algorithm described in the foregoing embodiment. An implementation of the used multiplication algorithm may be F=Second random identifier/Random/Amplification multiple, where Random is a random number. When a calculation result F=First random identifier, it can be determined that the relationship between the second random identifier and the first random identifier meets the preset algorithm. When the multiplication algorithm is used, a message received by the DHCPv6 server and sent by the DHCPv6 client apparatus includes a random number.

For still another example, the preset algorithm is implemented according to the digit transposition algorithm described in the foregoing embodiment. An implementation of the used digit transposition algorithm may be F=(Second random identifier/Random) Transposed digits, that is, digits of a result of dividing the second random identifier by Random are transposed, where Random is a random number. The digits are transposed in pairs from a high digit to a low digit. When a digit quantity of the second random identifier is an odd number, the lowest digit is not transposed. For example, according to the example in the foregoing embodiment, a first random identifier is 1234, and for example, a random number is 8 such that a second random identifier obtained by means of calculation is 17144. After obtaining the second random identifier, the DHCPv6 server calculates F=(17144/8) Transposed digits=1234 using a corresponding preset algorithm. Therefore, the relationship between the second random identifier and the first random identifier meets the preset algorithm. When the digit transposition algorithm is used, a message received by the DHCPv6 server and sent by the DHCPv6 client apparatus includes a random number.

Optionally, the message further includes an identifier of the preset algorithm, and the DHCPv6 server obtains the preset algorithm according to the identifier of the preset algorithm.

For example, the message sent by the DHCPv6 client apparatus to the DHCPv6 server includes the second random identifier. The second random identifier is generated by the DHCPv6 client apparatus using the first random identifier and the preset algorithm. After obtaining the second random identifier, the DHCPv6 server determines, using the same preset algorithm, whether the relationship between the second random identifier and the first random identifier meets the preset algorithm. Therefore, the DHCPv6 client apparatus needs to notify the DHCPv6 server of the algorithm used to generate the second random identifier. If both the DHCPv6 client apparatus and the DHCPv6 server store a correspondence between the preset algorithm and an identifier, and the second message includes the identifier of the preset algorithm, the DHCPv6 server obtains the algorithm corresponding to the identifier of the preset algorithm by querying the locally stored correspondence. For details, refer to FIG. 3 and corresponding description in the foregoing embodiment, and details are not described herein again.

For example, the DHCPv6 client apparatus may include a unique preset algorithm. Similarly, the DHCPv6 server may also include the unique preset algorithm. In this case, the DHCPv6 client apparatus and the DHCPv6 server use a same preset algorithm. Therefore, when the DHCPv6 client apparatus sends a message to the DHCPv6 server, the preset algorithm or the identifier of the preset algorithm does not need to be carried. In this case, the implementation format of the content of the random identifier field shown in FIG. 3 may not use the algorithm identifier field, or the algorithm identifier field may be set to null.

Optionally, the DHCPv6 server stores a one-to-one correspondence between at least two algorithms and algorithm identifiers, and the at least two algorithms include the preset algorithm.

For example, according to description in the foregoing embodiment, the DHCPv6 client apparatus may store the one-to-one correspondence between at least two algorithms and algorithm identifiers in advance, or may obtain the one-to-one correspondence between at least two algorithms and algorithm identifiers from a portal server. Correspondingly, when multiple algorithms are used, the DHCPv6 server stores the one-to-one correspondence between at least two algorithms and algorithm identifiers. By obtaining an algorithm identifier sent by the DHCPv6 client apparatus and by querying the locally stored correspondence, the DHCPv6 server may obtain the algorithm corresponding to the identifier of the preset algorithm.

Optionally, the DHCPv6 server obtains the algorithm corresponding to the identifier of the preset algorithm from a portal server, the portal server stores a one-to-one correspondence between at least two algorithms and algorithm identifiers, and the at least two algorithms include the preset algorithm.

For example, according to description in the foregoing embodiment, the DHCPv6 client apparatus may store the one-to-one correspondence between at least two algorithms and algorithm identifiers in advance, or may obtain the one-to-one correspondence between at least two algorithms and algorithm identifiers from the portal server. Similarly, the DHCPv6 server may not store an algorithm in advance, and the one-to-one correspondence between at least two algorithms and algorithm identifiers is stored in the portal server. After receiving a message from the DHCPv6 client apparatus, the DHCPv6 server obtains an algorithm identifier, and obtains the algorithm corresponding to the identifier of the preset algorithm based on the algorithm identifier from the portal server.

Figure 5:
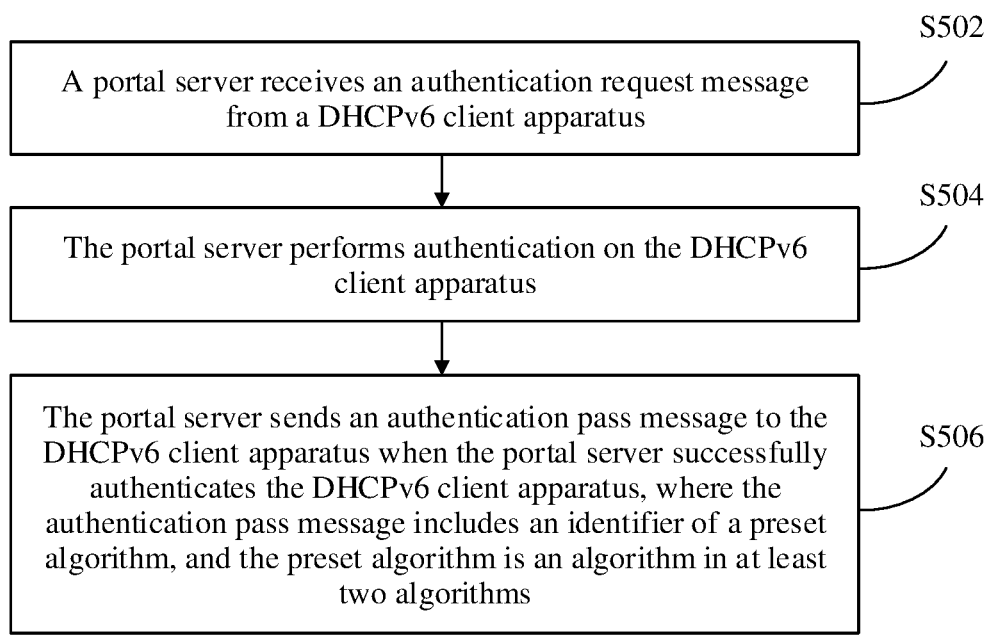
FIG. 5 is a flowchart of a method performed by a portal server to communicate with a DHCPv6 client apparatus according to an embodiment of the present application.

FIG. 5 is a flowchart of a method performed by a portal server to communicate with a DHCPv6 client apparatus according to an embodiment of the present application. In this embodiment of the present application, the method performed by the portal server to communicate with the DHCPv6 client apparatus is described from a perspective of the portal server. As shown in FIG. 5, the portal server stores a one-to-one correspondence between at least two algorithms and algorithm identifiers, and the method includes the following steps.

Step S502: The portal server receives an authentication request message from the DHCPv6 client apparatus.

The portal server is configured to perform validity authentication on the DHCPv6 client apparatus. In a process in which the DHCPv6 client apparatus interacts with a DHCPv6 server, the DHCPv6 client apparatus needs to be authenticated by the portal server. That is, after the DHCPv6 client apparatus accesses a network, and before the DHCPv6 client apparatus sends the DHCPv6 server a request message used to request assignment of an IPv6 address, the portal server needs to perform validity authentication on the DHCPv6 client apparatus. In an authentication process performed by the portal server, the DHCPv6 client apparatus needs to send an authentication request message to the portal server, and the portal server receives the authentication request message.

Step S504: The portal server performs authentication on the DHCPv6 client apparatus.

After receiving the authentication request message from the DHCPv6 client apparatus, the portal server performs validity authentication on the DHCPv6 client apparatus according to the authentication request message. For example, validity authentication is performed on the DHCPv6 client apparatus using a user name and a password of the DHCPv6 client apparatus.

Step S506: The portal server sends an authentication pass message to the DHCPv6 client apparatus when the portal server successfully authenticates the DHCPv6 client apparatus, where the authentication pass message includes an identifier of a preset algorithm, and the preset algorithm is an algorithm in the at least two algorithms.

The portal server sends the authentication pass message to the DHCPv6 client apparatus when the portal server successfully authenticates the DHCPv6 client apparatus. The portal server stores the one-to-one correspondence between at least two algorithms and algorithm identifiers. Therefore, the portal server may determine the used preset algorithm in the interaction process between the DHCPv6 client apparatus and the DHCPv6 server according to a control policy. After determining the preset algorithm, the portal server makes the authentication pass message include the identifier of the preset algorithm. In this way, after receiving the authentication pass message, the DHCPv6 client apparatus can determine validity of the DHCPv6 client apparatus. In addition, the DHCPv6 client apparatus can determine the used preset algorithm in the interaction process between the DHCPv6 client apparatus and the DHCPv6 server after obtaining the identifier of the preset algorithm in the authentication pass message. The control policy is not limited. The control policy may be set according to a service requirement. For example, the preset algorithm is determined in a random manner, the preset algorithm is cyclically used in sequence, the preset algorithm is determined according to a cycle, and the preset algorithm is determined according to a quantity of IPv6 addresses managed by the DHCPv6 server (For example, if a large quantity of IPv6 addresses is managed by the DHCPv6 server, a complex algorithm with a low probability of repeated calculation is selected).

For example, according to description in the foregoing embodiment, the DHCPv6 client apparatus may store the one-to-one correspondence between at least two algorithms and algorithm identifiers, that is, the DHCPv6 client apparatus stores the algorithm in advance, and the DHCPv6 client apparatus needs to obtain only the identifier of the preset algorithm from the portal server. The DHCPv6 client apparatus may not store the one-to-one correspondence between at least two algorithms and algorithm identifiers in advance. The DHCPv6 client apparatus obtains the identifier of the preset algorithm from the received authentication pass message, and obtains the preset algorithm from the portal server using a communications link between the DHCPv6 client apparatus and the portal server.

According to the method performed by a portal server to communicate with a DHCPv6 client apparatus provided in this embodiment, the portal server stores a one-to-one correspondence between at least two algorithms and algorithm identifiers. In a process in which the portal server performs authentication on the DHCPv6 client apparatus, the portal server adds an identifier of a preset algorithm to an authentication pass message such that the DHCPv6 client apparatus can determine, according to the algorithm identifier, the corresponding preset algorithm used to generate a second random identifier. This helps the DHCPv6 client apparatus generate a random identifier used for message exchange between a terminal device and a DHCPv6 server, to protect privacy of the terminal device.

Optionally, the authentication pass message includes attribute information, and the attribute information includes the identifier of the preset algorithm.

Figure 6:
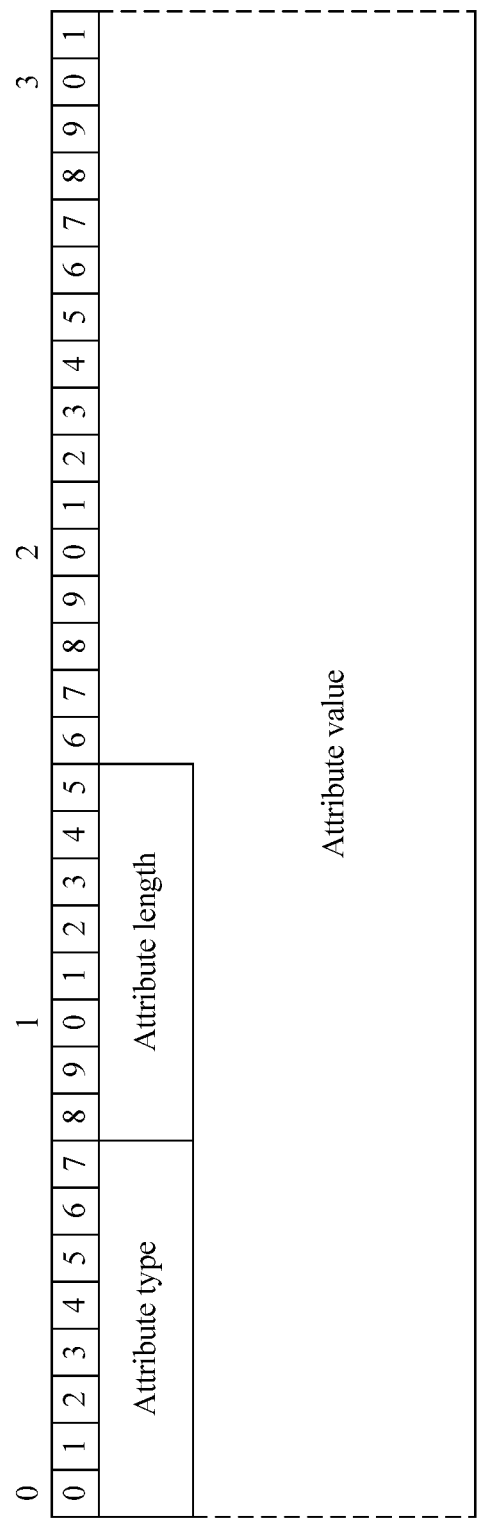
FIG. 6 is attribute information in an authentication pass message according to an embodiment of the present application.

For example, the authentication pass message includes the attribute information, and the attribute information may be used to carry the identifier of the preset algorithm. Referring to FIG. 6, FIG. 6 is attribute information in an authentication pass message according to an embodiment of the present application. As shown in FIG. 6, the attribute information includes an attribute type, an attribute length, and an attribute value. The attribute type identifies a type of the attribute information, and the attribute length represents a total length of the attribute type, the attribute length, and the attribute value. The attribute value has a variable length, and may be used to carry the identifier of the preset algorithm.

Figure 7:
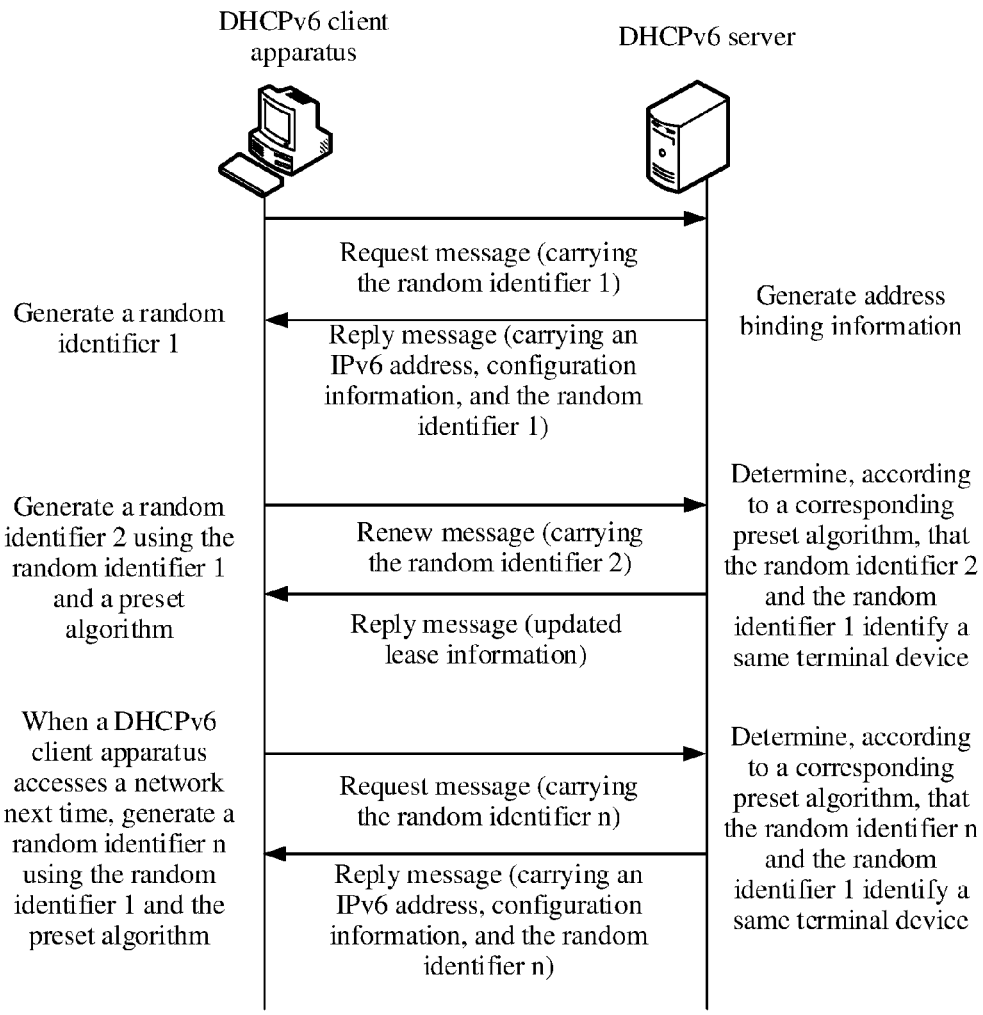
FIG. 7 is a schematic diagram of an interaction scenario between a DHCPv6 client apparatus and a DHCPv6 server according to an embodiment of the present application.

FIG. 7 is a schematic diagram of an interaction scenario between a DHCPv6 client apparatus and a DHCPv6 server according to an embodiment of the present application.

According to description in the foregoing embodiment, when the DHCPv6 client apparatus accesses a network, the DHCPv6 client apparatus generates a random identifier 1, and sends a request message to the DHCPv6 server. The request message includes the random identifier 1. After receiving the request message, the DHCPv6 server generates address binding information according to the random identifier 1, and then sends a reply message to the DHCPv6 client apparatus. The reply message includes an IPv6 address assigned to the DHCPv6 client apparatus, configuration information, and the random identifier 1.

In an embodiment, such as a lease expiration, the DHCPv6 client apparatus generates a random identifier 2 using a preset algorithm and the random identifier 1, and sends the DHCPv6 server a renew message that carries the random identifier 2. After receiving the renew message, the DHCPv6 server determines whether a relationship between the random identifier 2 and the random identifier 1 meets the corresponding preset algorithm. When the relationship between the random identifier 2 and the random identifier 1 meets the corresponding preset algorithm, it indicates that the random identifier 2 and the random identifier 1 identify a same DHCPv6 client apparatus. The DHCPv6 server sends a reply message to the DHCPv6 client apparatus. The reply message includes updated lease information.

For example, when the DHCPv6 client apparatus accesses a network next time, the DHCPv6 client apparatus generate a random identifier n using the random identifier 1 and the preset algorithm, and send the DHCPv6 server a request message that carries the random identifier n. After receiving the request message, the DHCPv6 server determines whether a relationship between the random identifier n and the random identifier 1 meets the corresponding preset algorithm. When the relationship between the random identifier n and the random identifier 1 meets the corresponding preset algorithm, it indicates that the random identifier n and the random identifier 1 identify a same DHCPv6 client apparatus. The DHCPv6 server sends a reply message to the DHCPv6 client apparatus. The reply message includes an IPv6 address assigned to the DHCPv6 client apparatus, configuration information, and the random identifier n. The IPv6 address assigned to the DHCPv6 client apparatus this time may be an IPv6 address obtained according to the address binding information and previously used by the DHCPv6 client apparatus, or may be a reassigned IPv6 address. A preset algorithm used when the DHCPv6 client apparatus accesses a network again may be the same as a preset algorithm used when the DHCPv6 client apparatus accesses the network last time, or may be different from a preset algorithm used when the DHCPv6 client apparatus accesses the network last time.

In the message processing method provided in this embodiment, a DHCPv6 client apparatus is identified using a random identifier in order to protect privacy of the DHCPv6 client apparatus. In addition, after determining that a relationship between a random identifier 2 and a random identifier 1 and a relationship between a random identifier n and the random identifier 1 meet a corresponding preset algorithm, a DHCPv6 server makes different random identifiers correspond to a same DHCPv6 client apparatus such that the DHCPv6 server conveniently collects statistics about information of the DHCPv6 client apparatus, such as duration of accessing a network.

Figure 8:
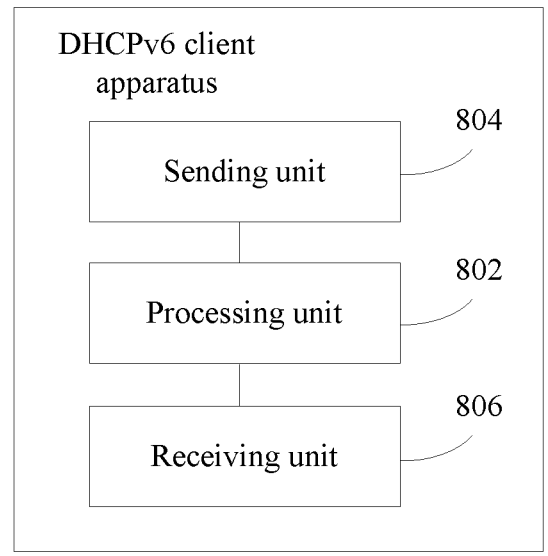
FIG. 8 is a schematic structural diagram of a DHCPv6 client apparatus according to an embodiment of the present application.

FIG. 8 is a schematic structural diagram of a DHCPv6 client apparatus according to an embodiment of the present application. The DHCPv6 client apparatus shown in FIG. 8 may perform corresponding steps performed by the DHCPv6 client apparatus in the method of the foregoing embodiment. As shown in FIG. 8, the DHCPv6 client apparatus includes a processing unit 802, a sending unit 804, and a receiving unit 806.

The processing unit 802 is configured to generate a first random identifier used to identify the DHCPv6 client apparatus.

The sending unit 804 is configured to send a first message used to request assignment of an IPv6 address to a DHCPv6 server, where the first message carries the first random identifier, and the first message does not include a DUID.

The receiving unit 806 is configured to receive a first reply message from the DHCPv6 server, where the first reply message includes a first IPv6 address, first configuration information, and the first random identifier.

The processing unit 802 is further configured to generate, using a preset algorithm and the first random identifier, a second random identifier used to identify the DHCPv6 client apparatus, where the second random identifier is different from the first random identifier.

The sending unit 804 is further configured to send a second message to the DHCPv6 server, where the second message carries the second random identifier, and the second message does not include the DUID.

The receiving unit 806 is further configured to receive a second reply message from the DHCPv6 server, where the second reply message includes a second IPv6 address, second configuration information, and the second random identifier.

Optionally, the second message includes an identifier of the preset algorithm, and the identifier of the preset algorithm is used to identify the preset algorithm.

Optionally, before the sending unit 804 sends the first message, the receiving unit 806 is further configured to obtain the identifier of the preset algorithm and the preset algorithm from a portal server, where the portal server stores a one-to-one correspondence between at least two algorithms and algorithm identifiers, and the at least two algorithms include the preset algorithm.

Optionally, the preset algorithm includes an amplification multiple, the first random identifier is less than the amplification multiple, and the amplification multiple is greater than 0.

Optionally, the second random identifier is equal to a sum of the first random identifier and a product of a random number and the amplification multiple, and the random number is a positive integer.

The DHCPv6 client apparatus shown in FIG. 8 may perform corresponding steps performed by the DHCPv6 client apparatus in the method of the foregoing embodiment. When the DHCPv6 client apparatus sends a first message to a DHCPv6 server, a first random identifier is carried, and when the DHCPv6 client apparatus sends a second message to the DHCPv6 server, a second random identifier generated using the first random identifier and a preset algorithm is carried. In addition, the second random identifier and the first random identifier are different random identifiers. In this way, the DHCPv6 client apparatus is identified using a random identifier in order to protect privacy of the DHCPv6 client apparatus, and improve network transmission security.

Figure 9:
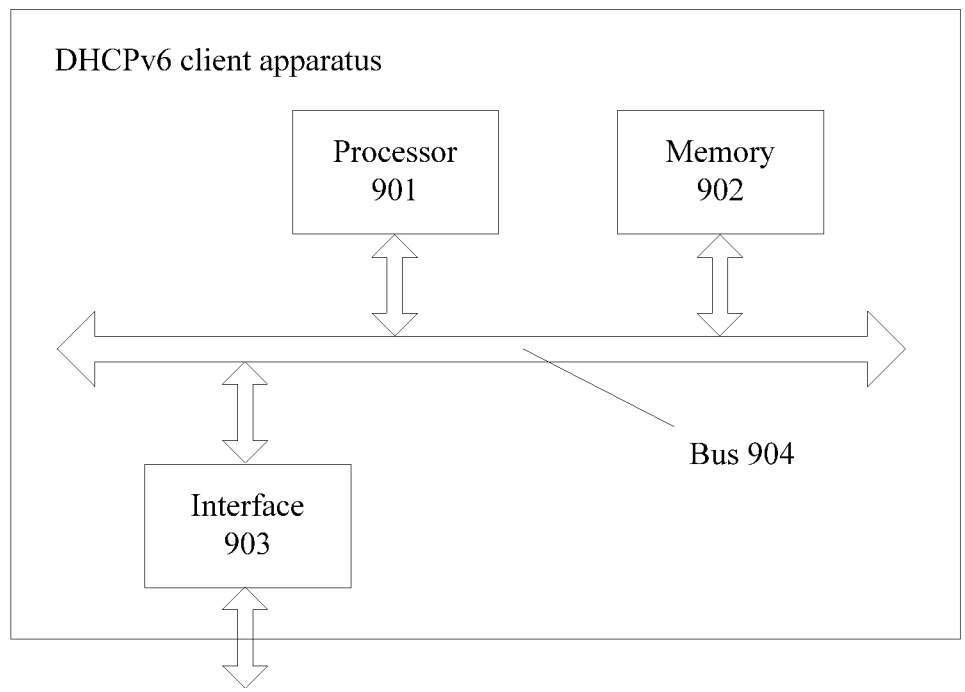
FIG. 9 is a schematic diagram of a hardware structure of a DHCPv6 client apparatus according to an embodiment of the present application.

FIG. 9 is a schematic diagram of a hardware structure of a DHCPv6 client apparatus according to an embodiment of the present application. The DHCPv6 client apparatus corresponding to FIG. 9 may perform corresponding steps performed by the DHCPv6 client apparatus in the method of the foregoing embodiment.

As shown in FIG. 9, the DHCPv6 client apparatus includes a processor 901, a memory 902, an interface 903, and a bus 904. The interface 903 may be implemented in a wireless or wired manner, and may be an element such as a network interface card. The processor 901, the memory 902, and the interface 903 are connected using the bus 904.

The memory 902 stores program code, and transmits the program code to the processor 901. Optionally, the memory 902 is configured to store a preset algorithm.

The processor 901 generates a first random identifier used to identify the DHCPv6 client apparatus.

The interface 903 sends a first message used to request assignment of an IPv6 address to a DHCPv6 server, the first message carries the first random identifier, and the first message does not include a DUID.

The interface 903 receives a first reply message from the DHCPv6 server, and the first reply message includes a first IPv6 address, first configuration information, and the first random identifier.

The processor 901 further generates, using the preset algorithm and the first random identifier, a second random identifier used to identify the DHCPv6 client apparatus, and the second random identifier is different from the first random identifier.

The interface 903 further sends a second message to the DHCPv6 server, the second message carries the second random identifier, and the second message does not include the DUID.

The interface 903 further receives a second reply message from the DHCPv6 server, and the second reply message includes a second IPv6 address, second configuration information, and the second random identifier.

Optionally, the second message includes an identifier of the preset algorithm, and the identifier of the preset algorithm is used to identify the preset algorithm.

Optionally, before sending the first message, the interface 903 further obtains the identifier of the preset algorithm and the preset algorithm from a portal server, and the portal server stores a one-to-one correspondence between at least two algorithms and algorithm identifiers, and the at least two algorithms include the preset algorithm.

Optionally, the preset algorithm includes an amplification multiple, the first random identifier is less than the amplification multiple, and the amplification multiple is greater than 0.

Optionally, the second random identifier is equal to a sum of the first random identifier and a product of a random number and the amplification multiple, and the random number is a positive integer.

The DHCPv6 client apparatus shown in FIG. 9 may perform corresponding steps performed by the DHCPv6 client apparatus in the method of the foregoing embodiment. When the DHCPv6 client apparatus sends a first message to a DHCPv6 server, a first random identifier is carried, and when the DHCPv6 client apparatus sends a second message to the DHCPv6 server, a second random identifier generated using the first random identifier and a preset algorithm is carried. In addition, the second random identifier and the first random identifier are different random identifiers. In this way, the DHCPv6 client apparatus is identified using a random identifier in order to protect privacy of the DHCPv6 client apparatus, and improve network transmission security.

Figure 10:
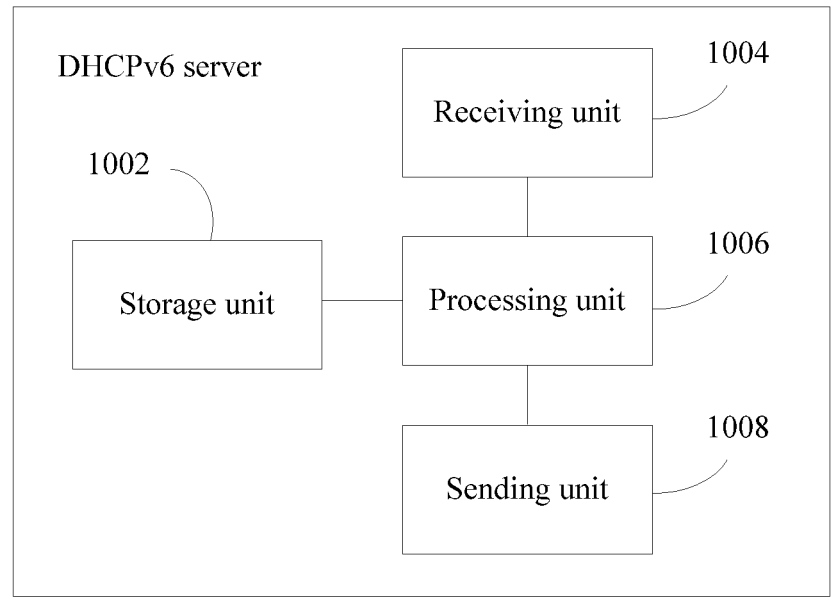
FIG. 10 is a schematic structural diagram of a DHCPv6 server according to an embodiment of the present application.

FIG. 10 is a schematic structural diagram of a DHCPv6 server according to an embodiment of the present application. The DHCPv6 server shown in FIG. 10 may perform corresponding steps performed by the DHCPv6 server in the method of the foregoing embodiment. As shown in FIG. 10, the DHCPv6 server includes a storage unit 1002, a receiving unit 1004, a processing unit 1006, and a sending unit 1008.

The storage unit 1002 is configured to store a first random identifier.

The receiving unit 1004 is configured to receive a message from a DHCPv6 client apparatus, where the message includes a second random identifier used to identify the DHCPv6 client apparatus, the second random identifier is different from the first random identifier, and the message does not include a DUID.

The processing unit 1006 is configured to determine whether a relationship between the second random identifier and the first random identifier meets a preset algorithm, and determine that the DHCPv6 client apparatus identified by the second random identifier is a DHCPv6 client apparatus identified by the first random identifier when the relationship between the second random identifier and the first random identifier meets the preset algorithm.

The sending unit 1008 is configured to send a reply message to the DHCPv6 client apparatus identified by the second random identifier, where the reply message includes an IPv6 address, configuration information, and the second random identifier.

Optionally, when the relationship between the second random identifier and the first random identifier does not meet the preset algorithm, the processing unit 1006 is further configured to assign an IPv6 address to the DHCPv6 client apparatus identified by the second random identifier, and store a correspondence between the assigned IPv6 address and the second random identifier.

Optionally, the preset algorithm includes an amplification multiple. The processing unit 1006 is further configured to determine whether a result of performing a modulo operation on the amplification multiple by the second random identifier is equal to the first random identifier. When the result of performing a modulo operation on the amplification multiple by the second random identifier is equal to the first random identifier, the DHCPv6 server determines that the relationship between the second random identifier and the first random identifier meets the preset algorithm.

Optionally, the message further includes an identifier of the preset algorithm, and the processing unit 1006 is further configured to obtain the preset algorithm according to the identifier of the preset algorithm.

Optionally, the storage unit 1002 is further configured to store a one-to-one correspondence between at least two algorithms and algorithm identifiers, where the at least two algorithms include the preset algorithm.

The DHCPv6 server shown in FIG. 10 may perform corresponding steps performed by the DHCPv6 server in the method of the foregoing embodiment. After obtaining a second random identifier, the DHCPv6 server determines whether a relationship between the second random identifier and a first random identifier meets a preset algorithm, and when the relationship between the second random identifier and the first random identifier meets the preset algorithm, the DHCPv6 server determines that a DHCPv6 client apparatus identified by the second random identifier is a DHCPv6 client apparatus identified by the first random identifier. Random identifiers in different phases are associated using the preset algorithm. Therefore, by means of algorithm parsing, the DHCPv6 server may make different random identifiers correspond to a same DHCPv6 client apparatus such that the DHCPv6 server conveniently collects statistics about information of the DHCPv6 client apparatus, such as duration of accessing a network. In this way, one DHCPv6 client apparatus may be allowed to use different random identifiers in order to protect privacy of the DHCPv6 client apparatus and improve network transmission security.

Figure 11:
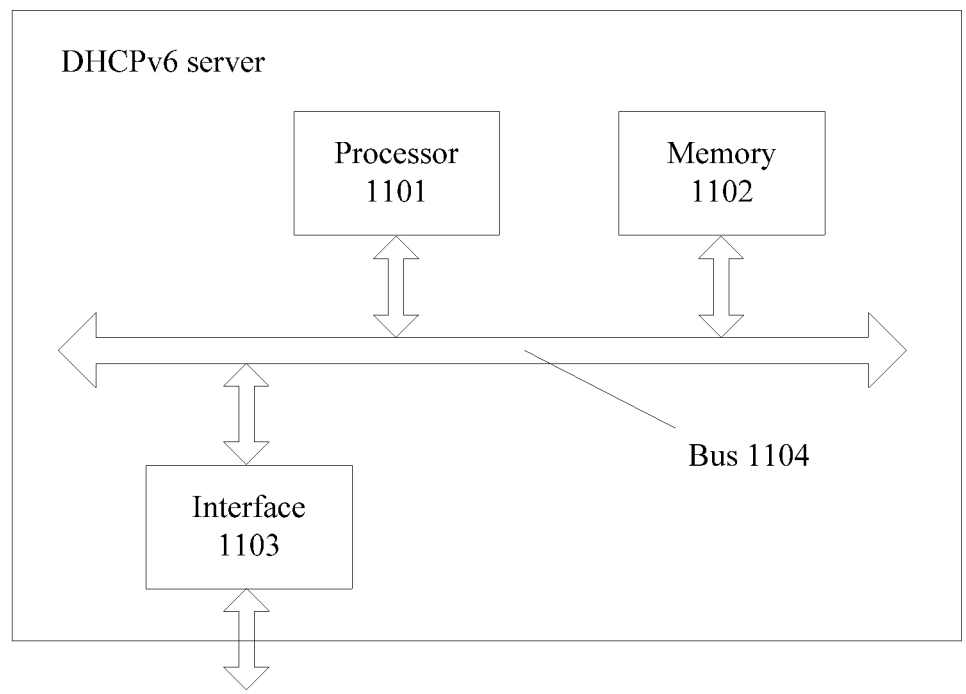
FIG. 11 is a schematic diagram of a hardware structure of a DHCPv6 server according to an embodiment of the present application.

FIG. 11 is a schematic diagram of a hardware structure of a DHCPv6 server according to an embodiment of the present application. The DHCPv6 server shown in FIG. 11 may perform corresponding steps performed by the DHCPv6 server in the method of the foregoing embodiment.

As shown in FIG. 11, the DHCPv6 server includes a processor 1101, a memory 1102, an interface 1103, and a bus 1104. The interface 1103 may be implemented in a wireless or wired manner, and may be an element such as a network interface card. The processor 1101, the memory 1102, and the interface 1103 are connected using the bus 1104.

The memory 1102 stores program code and a first random identifier, and transmits the program code and the first random identifier to the processor 1101. Optionally, the memory 1102 is configured to store a preset algorithm.

The interface 1103 receives a message from a DHCPv6 client apparatus, the message includes a second random identifier used to identify the DHCPv6 client apparatus, the second random identifier is different from the first random identifier, and the message does not include a DUID.

The processor 1101 determines whether a relationship between the second random identifier and the first random identifier meets the preset algorithm, and determines that the DHCPv6 client apparatus identified by the second random identifier is a DHCPv6 client apparatus identified by the first random identifier when the relationship between the second random identifier and the first random identifier meets the preset algorithm.

The interface 1103 is configured to send a reply message to the DHCPv6 client apparatus identified by the second random identifier, where the reply message includes an IPv6 address, configuration information, and the second random identifier.

Optionally, when the relationship between the second random identifier and the first random identifier does not meet the preset algorithm, the processor 1101 assigns an IPv6 address to the DHCPv6 client apparatus identified by the second random identifier, and stores a correspondence between the assigned IPv6 address and the second random identifier.

Optionally, the preset algorithm includes an amplification multiple, and the processor 1101 further determines whether a result of performing a modulo operation on the amplification multiple by the second random identifier is equal to the first random identifier. When the result of performing a modulo operation on the amplification multiple by the second random identifier is equal to the first random identifier, the DHCPv6 server determines that the relationship between the second random identifier and the first random identifier meets the preset algorithm.

Optionally, the message further includes an identifier of the preset algorithm, and the processor 1101 obtains the preset algorithm according to the identifier of the preset algorithm.

Optionally, the memory 1102 stores a one-to-one correspondence between at least two algorithms and algorithm identifiers, and the at least two algorithms include the preset algorithm.

The DHCPv6 server shown in FIG. 11 may perform corresponding steps performed by the DHCPv6 server in the method of the foregoing embodiment. After obtaining a second random identifier, the DHCPv6 server determines whether a relationship between the second random identifier and a first random identifier meets a preset algorithm, and when the relationship between the second random identifier and the first random identifier meets the preset algorithm, the DHCPv6 server determines that a DHCPv6 client apparatus identified by the second random identifier is a DHCPv6 client apparatus identified by the first random identifier. Random identifiers in different phases are associated using the preset algorithm. Therefore, the DHCPv6 server may make, by means of algorithm parsing, different random identifiers correspond to a same DHCPv6 client apparatus such that the DHCPv6 server conveniently collects statistics about information of the DHCPv6 client apparatus, such as duration of accessing a network. In this way, one DHCPv6 client apparatus may be allowed to use different random identifiers in order to protect privacy of the DHCPv6 client apparatus and improve network transmission security.

Figure 12:
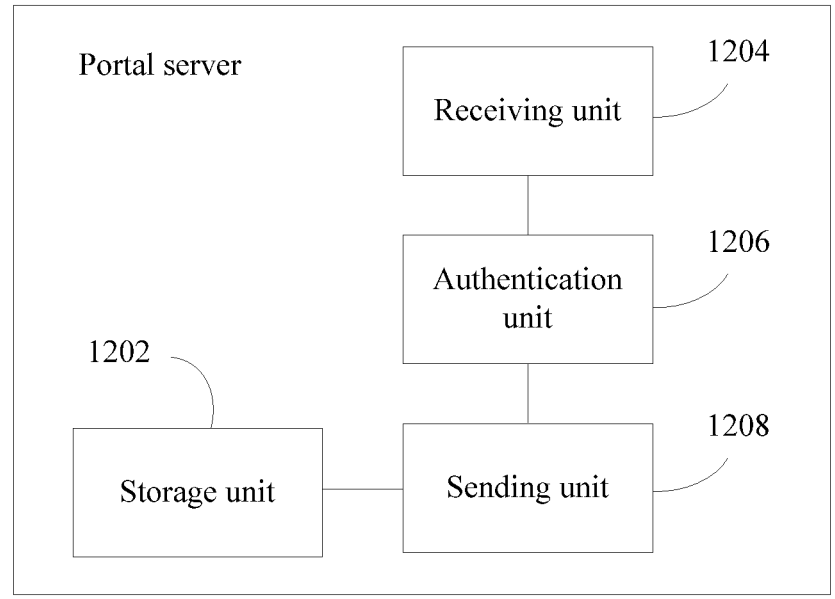
FIG. 12 is a schematic structural diagram of a portal server according to an embodiment of the present application.

FIG. 12 is a schematic structural diagram of a portal server according to an embodiment of the present application. The portal server shown in FIG. 12 may perform corresponding steps performed by the portal server in the method of the foregoing embodiment. As shown in FIG. 12, the portal server includes a storage unit 1202, a receiving unit 1204, an authentication unit 1206, and a sending unit 1208.

The storage unit 1202 is configured to store a one-to-one correspondence between at least two algorithms and algorithm identifiers.

The receiving unit 1204 is configured to receive an authentication request message from the DHCPv6 client apparatus.

The authentication unit 1206 is configured to perform authentication on the DHCPv6 client apparatus.

The sending unit 1208 is configured to send an authentication pass message to the DHCPv6 client apparatus when the authentication unit 1206 successfully authenticates the DHCPv6 client apparatus, where the authentication pass message includes an identifier of a preset algorithm, and the preset algorithm is an algorithm in the at least two algorithms.

Optionally, the authentication pass message includes attribute information, and the attribute information includes the identifier of the preset algorithm.

The portal server shown in FIG. 12 may perform corresponding steps performed by the portal server in the method of the foregoing embodiment. The portal server stores a one-to-one correspondence between at least two algorithms and algorithm identifiers. In a process in which the portal server performs authentication on a DHCPv6 client apparatus, the portal server adds an identifier of a preset algorithm to an authentication pass message such that the DHCPv6 client apparatus can determine, according to the algorithm identifier, the corresponding preset algorithm used to generate a second random identifier. This helps the DHCPv6 client apparatus generate a random identifier used for message exchange between a terminal device and a DHCPv6 server, to protect privacy of the terminal device.

Figure 13:
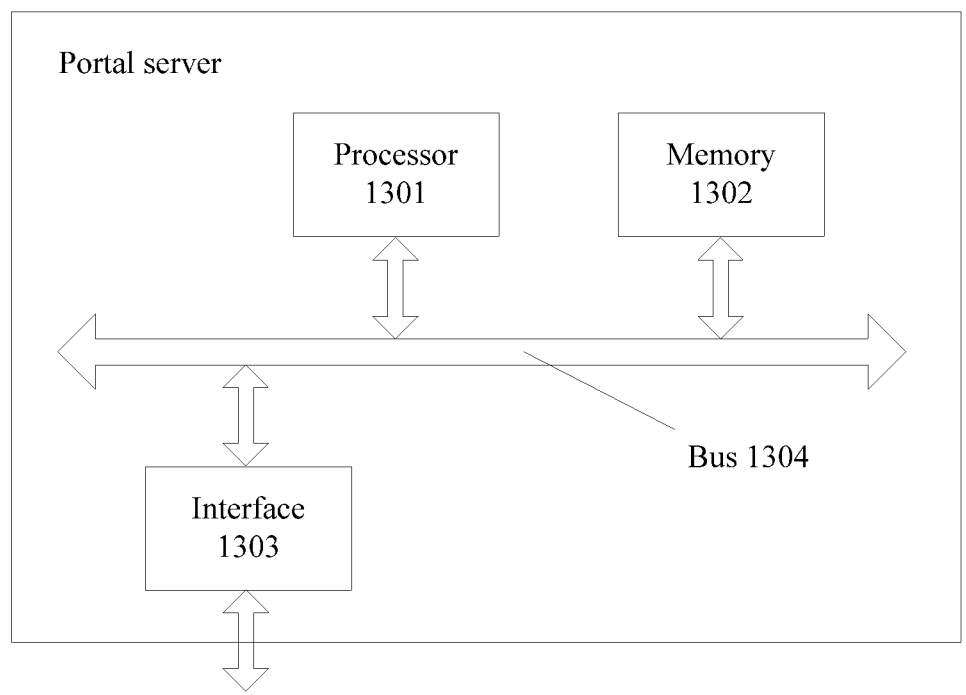
FIG. 13 is a schematic diagram of a hardware structure of a portal server according to an embodiment of the present application.

FIG. 13 is a schematic diagram of a hardware structure of a portal server according to an embodiment of the present application. The portal server shown in FIG. 13 may perform corresponding steps performed by the portal server in the method of the foregoing embodiment.

As shown in FIG. 13, the portal server includes a processor 1301, a memory 1302, an interface 1303, and a bus 1304. The interface 1303 may be implemented in a wireless or wired manner, and may be an element such as a network interface card. The processor 1301, the memory 1302, and the interface 1303 are connected using the bus 1304.

The memory 1302 stores program code and a one-to-one correspondence between at least two algorithms and algorithm identifiers. Optionally, the memory 1302 is configured to store a preset algorithm.

The interface 1303 receives an authentication request message from the DHCPv6 client apparatus.

The processor 1301 performs authentication on the DHCPv6 client apparatus.

After the processor 1301 successfully authenticates the DHCPv6 client apparatus, the processor 1301 sends an authentication pass message to the DHCPv6 client apparatus using the interface 1303, the authentication pass message includes an identifier of the preset algorithm, and the preset algorithm is an algorithm in the at least two algorithms.

Optionally, the authentication pass message includes attribute information, and the attribute information includes the identifier of the preset algorithm.

The portal server shown in FIG. 13 may perform corresponding steps performed by the portal server in the method of the foregoing embodiment. The portal server stores a one-to-one correspondence between at least two algorithms and algorithm identifiers. In a process in which the portal server performs authentication on a DHCPv6 client apparatus, the portal server adds an identifier of a preset algorithm to an authentication pass message such that the DHCPv6 client apparatus can determine, according to the algorithm identifier, the corresponding preset algorithm used to generate a second random identifier. This helps the DHCPv6 client apparatus generate a random identifier used for message exchange between a terminal device and a DHCPv6 server, to protect privacy of the terminal device.

Figure 14:
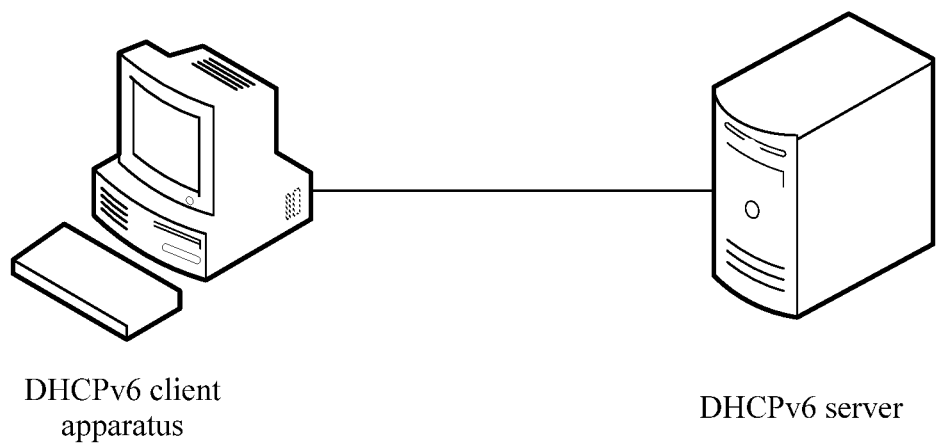
FIG. 14 is a system corresponding to a message processing method according to an embodiment of the present application.

FIG. 14 is a system corresponding to a message processing method according to an embodiment of the present application. The system provided in this embodiment of the present application may include the DHCPv6 client apparatus provided in the embodiment corresponding to FIG. 8 or FIG. 9 and the DHCPv6 server provided in the embodiment corresponding to FIG. 10 or FIG. 11. Details of the DHCPv6 client apparatus and the DHCPv6 server are not described herein again.

Optionally, the system further includes the portal server (not shown) provided in the embodiment corresponding to FIG. 12 or FIG. 13, and the portal server is not described herein again.

Persons of ordinary skill in the art may understand that all or a part of the steps of the method embodiments may be implemented by a program instructing relevant hardware. The program may be stored in a computer readable storage medium. The steps of the method embodiments are performed when the program runs. The foregoing storage medium includes any medium that can store program code, such as a random access memory (RAM), a read-only memory (ROM), an erasable programmable ROM (EPROM), a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A message processing method, comprising:
   sending, by a Dynamic Host Configuration Protocol for Internet Protocol version 6 (DHCPv6) client apparatus, a first message requesting assignment of an Internet Protocol version 6 (IPv6) address to a DHCPv6 server, wherein the first message comprises a first random identifier generated by the DHCPv6 client apparatus, wherein the first random identifier identifies the DHCPv6 client apparatus, and wherein the first message does not comprise a Dynamic Host Configuration Protocol (DHCP) unique identifier (DUID);
   receiving, by the DHCPv6 client apparatus, a first reply message from the DHCPv6 server, wherein the first reply message comprises a first IPv6 address, first configuration information, and the first random identifier;
   sending, by the DHCPv6 client apparatus, a second message to the DHCPv6 server, wherein the second message comprises a second random identifier generated by the DHCPv6 client apparatus using a preset algorithm and the first random identifier, wherein the second random identifier identifies the DHCPv6 client apparatus, wherein the second random identifier is different from the first random identifier, and wherein the second message does not comprise the DUID; and
   receiving, by the DHCPv6 client apparatus, a second reply message from the DHCPv6 server, wherein the second reply message comprises a second IPv6 address, second configuration information, and the second random identifier.

2. The method according to claim 1, wherein the second message further comprises an identifier of the preset algorithm identifying the preset algorithm.

3. The method according to claim 2, wherein before sending the first message to the DHCPv6 server, the method further comprises obtaining, by the DHCPv6 client apparatus, the identifier of the preset algorithm and the preset algorithm from a portal server, wherein the portal server is configured to store a one-to-one correspondence between at least two algorithms and algorithm identifiers, and wherein the at least two algorithms comprise the preset algorithm.

4. The method according to claim 1, wherein the second message further comprises the preset algorithm, and wherein the preset algorithm is stored in the DHCPv6 client apparatus in advance.

5. The method according to claim 1, wherein the second message further comprises the preset algorithm, and wherein the preset algorithm is obtained from a portal server by the DHCPv6 client apparatus.

6. The method according to claim 1, wherein the preset algorithm comprises an amplification multiple, wherein the first random identifier is less than the amplification multiple, and wherein the amplification multiple is greater than zero.

7. The method according to claim 6, wherein the second random identifier is equal to a sum of the first random identifier and a product of a random number and the amplification multiple, and wherein the random number is a positive integer.

8. A message processing method performed by a Dynamic Host Configuration Protocol for Internet Protocol version 6 (DHCPv6) server, wherein the DHCPv6 server is configured to store a first random identifier, and wherein the method comprises:
   receiving, by the DHCPv6 server, a message from a DHCPv6 client apparatus, wherein the message comprises a second random identifier, wherein the second random identifier identifies the DHCPv6 client apparatus, wherein the second random identifier is different from the first random identifier, and wherein the message does not comprise a Dynamic Host Configuration Protocol (DHCP) unique identifier (DUID);
   determining, by the DHCPv6 server, whether a relationship between the second random identifier and the first random identifier meets a preset algorithm;
   determining, by the DHCPv6 server, that the DHCPv6 client apparatus identified by the second random identifier is a DHCPv6 client apparatus identified by the first random identifier when the relationship between the second random identifier and the first random identifier meets the preset algorithm; and
   sending, by the DHCPv6 server, a reply message to the DHCPv6 client apparatus identified by the second random identifier, wherein the reply message comprises an Internet Protocol version 6 (IPv6) address, configuration information, and the second random identifier.

9. The method according to claim 8, wherein when the relationship between the second random identifier and the first random identifier does not meet the preset algorithm, the method further comprises:
   assigning, by the DHCPv6 server, the IPv6 address to the DHCPv6 client apparatus identified by the second random identifier; and
   storing, by the DHCPv6 server, a correspondence between the assigned IPv6 address and the second random identifier.

10. The method according to claim 8, wherein the preset algorithm comprises an amplification multiple, and wherein determining whether the relationship between the second random identifier and the first random identifier meets the preset algorithm comprises:
    determining, by the DHCPv6 server, whether a result of performing a modulo operation on the amplification multiple by the second random identifier is equal to the first random identifier; and determining, by the DHCPv6 server, that the relationship between the second random identifier and the first random identifier meets the preset algorithm when the result of performing the modulo operation on the amplification multiple by the second random identifier is equal to the first random identifier.

11. The method according to claim 8, wherein the message further comprises an identifier of the preset algorithm, and wherein the method further comprises obtaining, by the DHCPv6 server, the preset algorithm according to the identifier of the preset algorithm.

12. The method according to claim 11, further comprising storing, by the DHCPv6 server, a one-to-one correspondence between at least two algorithms and algorithm identifiers, and wherein the at least two algorithms comprise the preset algorithm.

13. The method according to claim 11, further comprising obtaining, by the DHCPv6 server from a portal server, an algorithm corresponding to the identifier of the preset algorithm, wherein the portal server stores a one-to-one correspondence between at least two algorithms and algorithm identifiers, and wherein the at least two algorithms comprise the preset algorithm.

14. A Dynamic Host Configuration Protocol for Internet Protocol version 6 (DHCPv6) client apparatus, comprising:
a memory configured to store instructions; and
a processor coupled to the memory, wherein the instructions cause the processor to be configured to:
generate a first random identifier identifying the DHCPv6 client apparatus;
send a first message requesting assignment of an Internet Protocol version 6 (IPv6) address to a DHCPv6 server, wherein the first message carries the first random identifier, and wherein the first message does not comprise a Dynamic Host Configuration Protocol (DHCP) unique identifier (DUID);
receive a first reply message from the DHCPv6 server, wherein the first reply message comprises a first IPv6 address, first configuration information, and the first random identifier;
generate, using a preset algorithm and the first random identifier, a second random identifier identifying the DHCPv6 client apparatus, wherein the second random identifier is different from the first random identifier;
send a second message to the DHCPv6 server, wherein the second message carries the second random identifier, and wherein the second message does not comprise the DUID; and
receive a second reply message from the DHCPv6 server, wherein the second reply message comprises a second IPv6 address, second configuration information, and the second random identifier.

15. The apparatus according to claim 14, wherein the second message further comprises an identifier of the preset algorithm identifying the preset algorithm.

16. The apparatus according to claim 15, wherein before sending the first message, the instructions further cause the processor to be configured to obtain the identifier of the preset algorithm and the preset algorithm from a portal server, wherein the portal server is configured to store a one-to-one correspondence between at least two algorithms and algorithm identifiers, and wherein the at least two algorithms comprise the preset algorithm.

17. The apparatus according to claim 14, wherein the preset algorithm comprises an amplification multiple, wherein the first random identifier is less than the amplification multiple, and wherein the amplification multiple is greater than zero.

18. The apparatus according to claim 17, wherein the second random identifier is equal to a sum of the first random identifier and a product of a random number and the amplification multiple, and wherein the random number is a positive integer.

* * * * *